US010248570B2

(12) United States Patent
Abdallah et al.

(10) Patent No.: US 10,248,570 B2
(45) Date of Patent: Apr. 2, 2019

(54) METHODS, SYSTEMS AND APPARATUS FOR PREDICTING THE WAY OF A SET ASSOCIATIVE CACHE

(71) Applicant: Intel Corporation, Santa Clara, CA (US)

(72) Inventors: Mohammad Abdallah, El Dorado Hills, CA (US); Ravishankar Rao, Redwood City, CA (US); Karthikeyan Avudaiyappan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/862,496

(22) Filed: Jan. 4, 2018

(65) Prior Publication Data

US 2018/0165206 A1    Jun. 14, 2018

Related U.S. Application Data

(63) Continuation of application No. 15/257,593, filed on Sep. 6, 2016, now Pat. No. 9,898,412, which is a
(Continued)

(51) Int. Cl.
*G06F 13/00* (2006.01)
*G06F 3/00* (2006.01)
(Continued)

(52) U.S. Cl.
CPC ...... *G06F 12/0864* (2013.01); *G06F 9/30058* (2013.01); *G06F 9/3802* (2013.01);
(Continued)

(58) Field of Classification Search
CPC .............. G06F 8/4442; G06F 12/0862; G06F 9/30047; G06F 9/3808; G06F 9/383;
(Continued)

(56) References Cited

U.S. PATENT DOCUMENTS 727,487 A    5/1903    Swan
4,075,704 A    2/1978    O'Leary
(Continued)

FOREIGN PATENT DOCUMENTS

CN    1214666 A    4/1999
CN    1305150 A    7/2001
(Continued)

OTHER PUBLICATIONS

Rotenberg, Eric et al. "Trace Cache: A Low Latency Approach to High Bandwidth Instruction Fetching," Apr. 11, 1996 (Year: 1996).*
(Continued)

*Primary Examiner* — Farley Abad
*Assistant Examiner* — Henry W Yu
(74) *Attorney, Agent, or Firm* — Nicholson De Vos Webster & Elliott LLP

(57) ABSTRACT

A method for predicting a way of a set associative shadow cache is disclosed. As a part of a method, a request to fetch a first far taken branch instruction of a first cache line from an instruction cache is received, and responsive to a hit in the instruction cache, a predicted way is selected from a way array using a way that corresponds to the hit in the instruction cache. A second cache line is selected from a shadow cache using the predicted way and the first cache line and the second cache line are forwarded in the same clock cycle.

20 Claims, 9 Drawing Sheets

Related U.S. Application Data continuation of application No. 14/215,633, filed on Mar. 17, 2014, now Pat. No. 9,904,625.

(60) Provisional application No. 61/793,703, filed on Mar. 15, 2013.

(51) Int. Cl.
*G06F 13/12* (2006.01)
*G06F 12/00* (2006.01)
*G06F 15/00* (2006.01)
*G06F 12/0864* (2016.01)
*G06F 12/0862* (2016.01)
*G06F 12/0811* (2016.01)
*G06F 9/30* (2018.01)
*G06F 9/38* (2018.01)
*G06F 12/0875* (2016.01)
*G06F 12/0897* (2016.01)

(52) U.S. Cl.
CPC ...... *G06F 12/0811* (2013.01); *G06F 12/0862* (2013.01); *G06F 12/0875* (2013.01); *G06F 12/0897* (2013.01); *G06F 2212/452* (2013.01)

(58) Field of Classification Search
CPC ............ G06F 12/0802; G06F 12/0844; G06F 12/0877; G06F 12/128; G06F 2212/60
USPC ........... 710/33, 52, 62; 711/3, 118–119, 123, 711/125, 128, 140, 202, 204; 712/206, 712/239, 33, 52, 62
See application file for complete search history.

(56) References Cited

U.S. PATENT DOCUMENTS

| | | |
|---|---|---|
| 4,245,344 A | 1/1981 | Richter |
| 4,356,550 A | 10/1982 | Katzman et al. |
| 4,414,624 A | 11/1983 | Summer, Jr. et al. |
| 4,524,415 A | 6/1985 | Mills, Jr. et al. |
| 4,527,237 A | 7/1985 | Frieder et al. |
| 4,577,273 A | 3/1986 | Hopper et al. |
| 4,597,061 A | 6/1986 | Cline et al. |
| 4,600,986 A | 7/1986 | Scheuneman et al. |
| 4,633,434 A | 12/1986 | Scheuneman |
| 4,682,281 A | 7/1987 | Woffinden et al. |
| 4,727,487 A | 2/1988 | Masui et al. |
| 4,816,991 A | 3/1989 | Watanabe et al. |
| 4,835,680 A | 5/1989 | Hogg et al. |
| 4,920,477 A | 4/1990 | Colwell et al. |
| 4,930,066 A | 5/1990 | Yokota |
| 4,943,909 A | 7/1990 | Huang |
| 5,197,130 A | 3/1993 | Chen et al. |
| 5,294,897 A | 3/1994 | Notani et al. |
| 5,317,705 A | 5/1994 | Gannon et al. |
| 5,317,754 A | 5/1994 | Blandy et al. |
| 5,339,398 A | 8/1994 | Shah et al. |
| 5,404,470 A | 4/1995 | Miyake |
| 5,469,376 A | 11/1995 | Abdallah |
| 5,471,593 A | 11/1995 | Branigin |
| 5,509,130 A | 4/1996 | Trauben et al. |
| 5,517,651 A | 5/1996 | Huck et al. |
| 5,524,090 A | 6/1996 | Iwamura |
| 5,548,742 A | 8/1996 | Wang et al. |
| 5,559,986 A | 9/1996 | Alpert et al. |
| 5,574,878 A | 11/1996 | Onodera et al. |
| 5,581,725 A | 12/1996 | Nakayama |
| 5,590,084 A | 12/1996 | Miyano et al. |
| 5,634,068 A | 5/1997 | Nishtala et al. |
| 5,649,136 A | 7/1997 | Shen et al. |
| 5,675,759 A | 10/1997 | Shebanow et al. |
| 5,699,537 A | 12/1997 | Sharangpani et al. |
| 5,710,902 A | 1/1998 | Sheaffer et al. |
| 5,724,565 A | 3/1998 | Dubey et al. |
| 5,751,982 A | 5/1998 | Morley |
| 5,752,260 A | 5/1998 | Liu |
| 5,754,818 A | 5/1998 | Mohamed |
| 5,761,476 A | 6/1998 | Martell |
| 5,787,494 A | 7/1998 | Delano et al. |
| 5,793,941 A | 8/1998 | Pencis et al. |
| 5,802,602 A | 9/1998 | Rahman et al. |
| 5,806,085 A | 9/1998 | Berliner |
| 5,813,031 A | 9/1998 | Chou et al. |
| 5,819,088 A | 10/1998 | Reinders |
| 5,829,028 A | 10/1998 | Lynch et al. |
| 5,835,951 A | 11/1998 | McMahan |
| 5,852,738 A | 12/1998 | Bealkowski et al. |
| 5,860,146 A | 1/1999 | Vishin et al. |
| 5,864,657 A | 1/1999 | Stiffler |
| 5,872,985 A | 2/1999 | Kimura |
| 5,881,277 A | 3/1999 | Bondi et al. |
| 5,901,294 A | 5/1999 | Tran et al. |
| 5,903,750 A | 5/1999 | Yeh et al. |
| 5,905,509 A | 5/1999 | Jones et al. |
| 5,911,057 A | 6/1999 | Shiell |
| 5,918,251 A | 6/1999 | Yamada et al. |
| 5,956,753 A | 9/1999 | Glew et al. |
| 5,974,506 A | 10/1999 | Sicola et al. |
| 5,978,906 A | 11/1999 | Tran |
| 5,983,327 A | 11/1999 | Achilles et al. |
| 6,016,533 A | 1/2000 | Tran |
| 6,016,540 A | 1/2000 | Zaidi et al. |
| 6,021,484 A | 2/2000 | Park |
| 6,065,105 A | 5/2000 | Zaidi et al. |
| 6,073,230 A | 6/2000 | Pickett et al. |
| 6,075,938 A | 6/2000 | Bugnion et al. |
| 6,085,315 A | 7/2000 | Fleck et al. |
| 6,088,780 A | 7/2000 | Yamada et al. |
| 6,092,172 A | 7/2000 | Nishimoto et al. |
| 6,101,577 A | 8/2000 | Tran |
| 6,108,769 A | 8/2000 | Chinnakonda et al. |
| 6,115,809 A | 9/2000 | Mattson, Jr. et al. |
| 6,134,634 A | 10/2000 | Marshall, Jr. et al. |
| 6,138,226 A | 10/2000 | Yoshioka et al. |
| 6,157,998 A | 12/2000 | Rupley, II et al. |
| 6,167,490 A | 12/2000 | Levy et al. |
| 6,170,051 B1 | 1/2001 | Dowling |
| 6,178,482 B1 | 1/2001 | Sollars |
| 6,185,660 B1 | 2/2001 | Mulla et al. |
| 6,205,545 B1 | 3/2001 | Shah et al. |
| 6,209,085 B1 | 3/2001 | Hammond et al. |
| 6,212,542 B1 | 4/2001 | Kahle et al. |
| 6,212,613 B1 | 4/2001 | Belair |
| 6,216,215 B1 | 4/2001 | Palanca et al. |
| 6,226,732 B1 | 5/2001 | Pei et al. |
| 6,247,097 B1 | 6/2001 | Sinharoy |
| 6,253,316 B1 | 6/2001 | Tran et al. |
| 6,256,727 B1 | 7/2001 | McDonald |
| 6,256,728 B1 | 7/2001 | Witt et al. |
| 6,260,131 B1 | 7/2001 | Kikuta et al. |
| 6,260,138 B1 | 7/2001 | Harris |
| 6,269,439 B1 | 7/2001 | Hanaki |
| 6,272,616 B1 | 8/2001 | Fernando et al. |
| 6,272,662 B1 | 8/2001 | Jadav et al. |
| 6,275,917 B1 | 8/2001 | Okada |
| 6,282,583 B1 | 8/2001 | Pincus et al. |
| 6,282,638 B1 | 8/2001 | Dowling |
| 6,308,323 B1 | 10/2001 | Douniwa |
| 6,321,298 B1 | 11/2001 | Hubis |
| 6,327,650 B1 | 12/2001 | Bapst et al. |
| 6,332,189 B1 | 12/2001 | Baweja et al. |
| 6,339,822 B1 | 1/2002 | Miller |
| 6,341,324 B1 | 1/2002 | Caulk, Jr. et al. |
| 6,345,357 B1 | 2/2002 | Sato |
| 6,360,311 B1 | 3/2002 | Zandveld et al. |
| 6,408,367 B2 | 6/2002 | Achilles et al. |
| 6,437,789 B1 | 8/2002 | Tidwell et al. |
| 6,449,671 B1 | 9/2002 | Patkar et al. |
| 6,457,120 B1 | 9/2002 | Sinharoy |
| 6,473,833 B1 | 10/2002 | Arimilli et al. |
| 6,490,673 B1 | 12/2002 | Heishi et al. |
| 6,502,187 B1 | 12/2002 | Miyagawa |
| 6,529,928 B1 | 3/2003 | Resnick et al. |
| 6,542,984 B1 | 4/2003 | Keller et al. |

(56) References Cited

U.S. PATENT DOCUMENTS

| | | |
|---|---|---|
| 6,557,083 B1 | 4/2003 | Sperber et al. |
| 6,557,095 B1 | 4/2003 | Henstrom |
| 6,594,755 B1 | 7/2003 | Nuechterlein et al. |
| 6,604,187 B1 | 8/2003 | McGrath et al. |
| 6,609,189 B1 | 8/2003 | Kuszmaul et al. |
| 6,615,340 B1 | 9/2003 | Wilmot, II |
| 6,658,549 B2 | 12/2003 | Wilson et al. |
| 6,668,316 B1 | 12/2003 | Gorshtein et al. |
| 6,681,395 B1 | 1/2004 | Nishi |
| 6,704,860 B1 | 3/2004 | Moore |
| 6,721,874 B1 | 4/2004 | Le et al. |
| 6,728,866 B1 | 4/2004 | Kahle et al. |
| 6,775,761 B2 | 8/2004 | Wang et al. |
| 6,829,698 B2 | 12/2004 | Arimilli et al. |
| 6,850,531 B1 | 2/2005 | Rao et al. |
| 6,882,177 B1 | 4/2005 | Reddy et al. |
| 6,907,600 B2 | 6/2005 | Neiger et al. |
| 6,912,644 B1 | 6/2005 | O'Connor et al. |
| 6,920,530 B2 | 7/2005 | Musumeci |
| 6,944,744 B2 | 9/2005 | Ahmed et al. |
| 6,948,172 B1 | 9/2005 | D'Souza |
| 6,950,927 B1 | 9/2005 | Apisdorf et al. |
| 6,954,846 B2 | 10/2005 | Leibholz et al. |
| 6,985,591 B2 | 1/2006 | Graunke |
| 6,988,183 B1 | 1/2006 | Wong |
| 7,007,108 B2 | 2/2006 | Emerson et al. |
| 7,020,879 B2 | 3/2006 | Nemirovsky et al. |
| 7,047,322 B1 | 5/2006 | Bauman et al. |
| 7,111,145 B1 | 9/2006 | Chen et al. |
| 7,117,347 B2 | 10/2006 | Col et al. |
| 7,139,855 B2 | 11/2006 | Armstrong et al. |
| 7,143,273 B2 | 11/2006 | Miller et al. |
| 7,149,872 B2 | 12/2006 | Rozas et al. |
| 7,150,021 B1 | 12/2006 | Vajjhala et al. |
| 7,171,535 B2 | 1/2007 | Naoi |
| 7,203,824 B2 | 4/2007 | Bean et al. |
| 7,206,925 B1 | 4/2007 | Jacobson et al. |
| 7,213,106 B1 | 5/2007 | Koster et al. |
| 7,213,248 B2 | 5/2007 | Arimilli et al. |
| 7,231,106 B2 * | 6/2007 | Basavanhally ...... G02B 6/3546 385/17 |
| 7,257,695 B2 | 8/2007 | Jiang et al. |
| 7,278,030 B1 | 10/2007 | Chen et al. |
| 7,284,092 B2 | 10/2007 | Nunamaker et al. |
| 7,290,261 B2 | 10/2007 | Burky et al. |
| 7,313,775 B2 | 12/2007 | Casey et al. |
| 7,343,476 B2 | 3/2008 | Floyd et al. |
| 7,373,637 B2 | 5/2008 | DeWitt et al. |
| 7,380,096 B1 | 5/2008 | Rozas et al. |
| 7,383,427 B2 | 6/2008 | Yamazaki |
| 7,398,347 B1 | 7/2008 | Pechanek et al. |
| 7,406,581 B2 | 7/2008 | Southwell et al. |
| 7,418,579 B2 | 8/2008 | Guibert et al. |
| 7,418,582 B1 | 8/2008 | Iacobovici et al. |
| 7,441,110 B1 | 10/2008 | Puzak et al. |
| 7,493,475 B2 | 2/2009 | Colavin |
| 7,539,879 B2 | 5/2009 | Terechko et al. |
| 7,546,420 B1 | 6/2009 | Shar et al. |
| 7,577,820 B1 | 8/2009 | Wentzlaff et al. |
| 7,613,131 B2 | 11/2009 | Decasper et al. |
| 7,617,384 B1 | 11/2009 | Coon et al. |
| 7,634,637 B1 | 12/2009 | Lindholm et al. |
| 7,647,483 B2 | 1/2010 | Bates et al. |
| 7,680,988 B1 | 3/2010 | Nickolls et al. |
| 7,681,019 B1 | 3/2010 | Favor |
| 7,707,397 B2 | 4/2010 | Henry et al. |
| 7,707,578 B1 | 4/2010 | Zedlewski et al. |
| 7,711,929 B2 | 5/2010 | Burky et al. |
| 7,716,460 B2 | 5/2010 | Stempel et al. |
| 7,757,065 B1 | 7/2010 | Jourdan et al. |
| 7,770,161 B2 | 8/2010 | Mitran et al. |
| 7,783,868 B2 | 8/2010 | Ukai |
| 7,783,869 B2 | 8/2010 | Grandou et al. |
| 7,809,925 B2 | 10/2010 | Mejdrich et al. |
| 7,848,129 B1 | 12/2010 | Deshpande et al. |
| 7,856,530 B1 | 12/2010 | Mu |
| 7,861,060 B1 | 12/2010 | Nickolls et al. |
| 7,877,582 B2 | 1/2011 | Gschwind et al. |
| 7,913,058 B2 | 3/2011 | Rozas et al. |
| 7,925,869 B2 | 4/2011 | Kelsey et al. |
| 8,044,951 B1 | 10/2011 | Brown et al. |
| 8,046,775 B2 | 10/2011 | Kang et al. |
| 8,082,420 B2 | 12/2011 | Comparan et al. |
| 8,108,545 B2 | 1/2012 | Arimilli et al. |
| 8,145,844 B2 | 3/2012 | Bruce |
| 8,145,880 B1 | 3/2012 | Cismas et al. |
| 8,145,882 B1 | 3/2012 | Kishore et al. |
| 8,200,949 B1 | 6/2012 | Tarjan et al. |
| 8,219,996 B1 | 7/2012 | Morris |
| 8,230,423 B2 | 7/2012 | Frigo et al. |
| 8,239,656 B2 | 8/2012 | Rozas et al. |
| 8,301,847 B2 | 10/2012 | Dantzig et al. |
| 8,316,435 B1 | 11/2012 | Varadhan et al. |
| 8,327,115 B2 | 12/2012 | Abdallah |
| 8,438,366 B2 | 5/2013 | Akizuki et al. |
| 8,522,253 B1 | 8/2013 | Rozas et al. |
| 8,539,486 B2 | 9/2013 | Cain, III et al. |
| 8,645,965 B2 | 2/2014 | Zimmer et al. |
| 8,756,329 B2 | 6/2014 | Reynolds et al. |
| 8,868,838 B1 | 10/2014 | Glasco et al. |
| 8,930,674 B2 | 1/2015 | Avudaiyappan et al. |
| 9,047,178 B2 | 6/2015 | Talagala et al. |
| 9,135,003 B2 | 9/2015 | Suh et al. |
| 9,811,377 B2 | 11/2017 | Abdallah et al. |
| 9,823,930 B2 | 11/2017 | Abdallah et al. |
| 2001/0016901 A1 | 8/2001 | Topham |
| 2001/0032303 A1 | 10/2001 | Pechanek et al. |
| 2001/0049782 A1 | 12/2001 | Hsu et al. |
| 2002/0029308 A1 | 3/2002 | Babaian et al. |
| 2002/0062435 A1 | 5/2002 | Nemirovsky et al. |
| 2002/0069326 A1 | 6/2002 | Richardson et al. |
| 2002/0082824 A1 | 6/2002 | Neiger et al. |
| 2002/0083312 A1 | 6/2002 | Sinharoy |
| 2002/0099913 A1 | 7/2002 | Steely et al. |
| 2002/0126657 A1 | 9/2002 | Frouin et al. |
| 2002/0129085 A1 | 9/2002 | Kubala et al. |
| 2002/0174321 A1 | 11/2002 | John et al. |
| 2002/0188833 A1 | 12/2002 | Henry et al. |
| 2003/0035422 A1 | 2/2003 | Hill |
| 2003/0065887 A1 | 4/2003 | Maiyuran et al. |
| 2003/0088752 A1 | 5/2003 | Harman |
| 2003/0093776 A1 | 5/2003 | Hilton |
| 2003/0101322 A1 | 5/2003 | Gardner |
| 2003/0101444 A1 | 5/2003 | Wu et al. |
| 2003/0126408 A1 | 7/2003 | Vajapeyam et al. |
| 2003/0131335 A1 | 7/2003 | Hamlin |
| 2003/0149862 A1 | 8/2003 | Kadambi |
| 2003/0163642 A1 | 8/2003 | Borkenhagen et al. |
| 2003/0169626 A1 | 9/2003 | Burk et al. |
| 2003/0200396 A1 | 10/2003 | Musumeci |
| 2003/0200412 A1 | 10/2003 | Peinado et al. |
| 2003/0202530 A1 | 10/2003 | Jenkins et al. |
| 2003/0225938 A1 | 12/2003 | Glasco et al. |
| 2003/0226001 A1 | 12/2003 | Moyer et al. |
| 2003/0233394 A1 | 12/2003 | Rudd et al. |
| 2004/0034762 A1 | 2/2004 | Kacevas |
| 2004/0044850 A1 | 3/2004 | George et al. |
| 2004/0064668 A1 | 4/2004 | Kjos et al. |
| 2004/0073909 A1 | 4/2004 | Arimilli et al. |
| 2004/0078538 A1 | 4/2004 | Dutt et al. |
| 2004/0093483 A1 | 5/2004 | Nguyen et al. |
| 2004/0098567 A1 | 5/2004 | Hansen et al. |
| 2004/0103251 A1 | 5/2004 | Alsup |
| 2004/0117593 A1 | 6/2004 | Uhlig et al. |
| 2004/0117594 A1 | 6/2004 | Vanderspek |
| 2004/0122887 A1 | 6/2004 | Macy |
| 2004/0138857 A1 | 7/2004 | Souza et al. |
| 2004/0139441 A1 | 7/2004 | Kaburaki et al. |
| 2004/0143727 A1 | 7/2004 | McDonald |
| 2004/0158822 A1 | 8/2004 | Sandham et al. |
| 2004/0172523 A1 | 9/2004 | Merchant et al. |
| 2004/0187123 A1 | 9/2004 | Tremblay et al. |
| 2004/0193857 A1 | 9/2004 | Miller et al. |
| 2004/0202158 A1 | 10/2004 | Takeno et al. |

(56) References Cited

U.S. PATENT DOCUMENTS

| | | |
|---|---|---|
| 2004/0205296 A1 | 10/2004 | Bearden |
| 2004/0215886 A1 | 10/2004 | Cargnoni et al. |
| 2004/0216105 A1 | 10/2004 | Burky et al. |
| 2004/0216120 A1 | 10/2004 | Burky et al. |
| 2004/0225872 A1 | 11/2004 | Bonanno et al. |
| 2005/0005085 A1 | 1/2005 | Miyanaga |
| 2005/0027961 A1 | 2/2005 | Zhang |
| 2005/0044547 A1 | 2/2005 | Gipp |
| 2005/0055504 A1 | 3/2005 | Hass et al. |
| 2005/0060457 A1 | 3/2005 | Olukotun |
| 2005/0066131 A1 | 3/2005 | Biles et al. |
| 2005/0108480 A1 | 5/2005 | Correale, Jr. et al. |
| 2005/0108715 A1 | 5/2005 | Kanai et al. |
| 2005/0114603 A1 | 5/2005 | Buti et al. |
| 2005/0120191 A1 | 6/2005 | Akkary et al. |
| 2005/0120194 A1 | 6/2005 | Kissell |
| 2005/0132145 A1 | 6/2005 | Dybsetter et al. |
| 2005/0154867 A1 | 7/2005 | DeWitt et al. |
| 2005/0204118 A1 | 9/2005 | Jen et al. |
| 2005/0216920 A1 | 9/2005 | Tewari et al. |
| 2005/0251639 A1 | 11/2005 | Vishin et al. |
| 2005/0251649 A1 | 11/2005 | Yamazaki |
| 2005/0262270 A1 | 11/2005 | Latorre et al. |
| 2005/0289299 A1 | 12/2005 | Nunamaker et al. |
| 2005/0289530 A1 | 12/2005 | Robison |
| 2006/0004964 A1 | 1/2006 | Conti et al. |
| 2006/0026381 A1 | 2/2006 | Doi et al. |
| 2006/0026408 A1 | 2/2006 | Morris et al. |
| 2006/0036516 A1 | 2/2006 | Glebe |
| 2006/0080380 A1 | 4/2006 | Aizu et al. |
| 2006/0094446 A1 | 5/2006 | Duan |
| 2006/0095720 A1 | 5/2006 | Biles et al. |
| 2006/0143390 A1 | 6/2006 | Kottapalli |
| 2006/0161421 A1 | 7/2006 | Kissell |
| 2006/0161921 A1 | 7/2006 | Kissell |
| 2006/0179257 A1 | 8/2006 | Chu et al. |
| 2006/0179281 A1 | 8/2006 | Jensen et al. |
| 2006/0179289 A1 | 8/2006 | Floyd et al. |
| 2006/0190707 A1 | 8/2006 | McIlvaine et al. |
| 2006/0212687 A1 | 9/2006 | Chen et al. |
| 2006/0230243 A1 | 10/2006 | Cochran et al. |
| 2006/0230253 A1 | 10/2006 | Codrescu et al. |
| 2006/0230409 A1 | 10/2006 | Frigo et al. |
| 2006/0236074 A1 | 10/2006 | Williamson et al. |
| 2006/0236080 A1 | 10/2006 | Doing et al. |
| 2006/0242365 A1 | 10/2006 | Ali et al. |
| 2006/0242384 A1 | 10/2006 | Ahmed et al. |
| 2006/0256641 A1 | 11/2006 | Johnstone |
| 2006/0277365 A1 | 12/2006 | Pong |
| 2006/0282839 A1 | 12/2006 | Hankins et al. |
| 2007/0006231 A1 | 1/2007 | Wang et al. |
| 2007/0074005 A1 | 3/2007 | Abernathy et al. |
| 2007/0198665 A1 | 8/2007 | De Matteis et al. |
| 2007/0214343 A1 | 9/2007 | Lindholm et al. |
| 2007/0226722 A1 | 9/2007 | Chou |
| 2007/0262270 A1 | 11/2007 | Huang et al. |
| 2008/0016507 A1 | 1/2008 | Thomas et al. |
| 2008/0040724 A1 | 2/2008 | Kang et al. |
| 2008/0046666 A1 | 2/2008 | Termaine et al. |
| 2008/0052432 A1 | 2/2008 | Wilson et al. |
| 2008/0077813 A1 | 3/2008 | Keller et al. |
| 2008/0091880 A1 | 4/2008 | Vishin |
| 2008/0104598 A1 | 5/2008 | Chang |
| 2008/0109611 A1 | 5/2008 | Liu et al. |
| 2008/0126643 A1 | 5/2008 | Higuchi |
| 2008/0126771 A1 | 5/2008 | Chen et al. |
| 2008/0148237 A1 | 6/2008 | Jiang et al. |
| 2008/0184211 A1 | 7/2008 | Nickolls et al. |
| 2008/0195844 A1 | 8/2008 | Shen et al. |
| 2008/0215865 A1 | 9/2008 | Hino et al. |
| 2008/0225987 A1 | 9/2008 | Fazzi et al. |
| 2008/0235500 A1 | 9/2008 | Davis et al. |
| 2008/0250227 A1 | 10/2008 | Linderman et al. |
| 2008/0250232 A1 | 10/2008 | Nakashima |
| 2008/0256278 A1 | 10/2008 | Thomas et al. |
| 2008/0256330 A1 | 10/2008 | Wang et al. |
| 2008/0270758 A1 | 10/2008 | Ozer et al. |
| 2008/0270774 A1 | 10/2008 | Singh et al. |
| 2008/0282037 A1 | 11/2008 | Kusachi et al. |
| 2008/0320476 A1 | 12/2008 | Wingard et al. |
| 2009/0019264 A1 | 1/2009 | Correale, Jr. et al. |
| 2009/0031104 A1 | 1/2009 | Vorbach et al. |
| 2009/0070554 A1 | 3/2009 | Wang et al. |
| 2009/0113170 A1 | 4/2009 | Abdallah |
| 2009/0119457 A1 | 5/2009 | Latorre et al. |
| 2009/0138659 A1 | 5/2009 | Lauterbach |
| 2009/0138670 A1 | 5/2009 | Mutlu et al. |
| 2009/0150647 A1 | 6/2009 | Mejdrich et al. |
| 2009/0150890 A1 | 6/2009 | Yourst |
| 2009/0157980 A1 | 6/2009 | Bruce |
| 2009/0158017 A1 | 6/2009 | Mutlu et al. |
| 2009/0164733 A1 | 6/2009 | Kim et al. |
| 2009/0164766 A1 | 6/2009 | Suggs et al. |
| 2009/0165007 A1 | 6/2009 | Aghajanyan |
| 2009/0172344 A1 | 7/2009 | Grochowski et al. |
| 2009/0240919 A1 | 9/2009 | Alexander et al. |
| 2009/0241084 A1 | 9/2009 | Malley et al. |
| 2009/0249026 A1 | 10/2009 | Smelyanskiy et al. |
| 2009/0251476 A1 | 10/2009 | Jiao et al. |
| 2009/0282101 A1 | 11/2009 | Lim et al. |
| 2009/0287912 A1 | 11/2009 | Sendag |
| 2009/0307450 A1 | 12/2009 | Lee |
| 2009/0313462 A1 | 12/2009 | Emma et al. |
| 2009/0328053 A1 | 12/2009 | Dice |
| 2010/0058033 A1 | 3/2010 | Abernathy et al. |
| 2010/0064121 A1 | 3/2010 | Alexander et al. |
| 2010/0082912 A1 | 4/2010 | Lesartre et al. |
| 2010/0088443 A1 | 4/2010 | Riocreux et al. |
| 2010/0100690 A1 | 4/2010 | Rajamani et al. |
| 2010/0100704 A1 | 4/2010 | Hill et al. |
| 2010/0100707 A1 | 4/2010 | Mejdrich et al. |
| 2010/0115167 A1 | 5/2010 | Tardieux et al. |
| 2010/0115244 A1 | 5/2010 | Jensen et al. |
| 2010/0138607 A1 | 6/2010 | Hughes et al. |
| 2010/0154042 A1 | 6/2010 | Miyamoto et al. |
| 2010/0161948 A1 | 6/2010 | Abdallah |
| 2010/0169578 A1 | 7/2010 | Nychka et al. |
| 2010/0169611 A1 | 7/2010 | Chou et al. |
| 2010/0205603 A1 | 8/2010 | Merten et al. |
| 2010/0211746 A1 | 8/2010 | Tsukishiro |
| 2010/0280996 A1 | 11/2010 | Gross, IV et al. |
| 2010/0286976 A1 | 11/2010 | Gao et al. |
| 2010/0299671 A1 | 11/2010 | Kinsey |
| 2010/0306503 A1 | 12/2010 | Henry et al. |
| 2010/0325394 A1 | 12/2010 | Golla et al. |
| 2010/0332805 A1 | 12/2010 | Blasco et al. |
| 2011/0010521 A1 | 1/2011 | Wang et al. |
| 2011/0055479 A1 | 3/2011 | West et al. |
| 2011/0067016 A1 | 3/2011 | Mizrachi et al. |
| 2011/0082980 A1 | 4/2011 | Gschwind et al. |
| 2011/0082983 A1 | 4/2011 | Koktan |
| 2011/0093857 A1 | 4/2011 | Sydow et al. |
| 2011/0119660 A1 | 5/2011 | Tanaka |
| 2011/0153955 A1 | 6/2011 | Herrenschmidt et al. |
| 2011/0225588 A1 | 9/2011 | Pollock et al. |
| 2012/0005462 A1 | 1/2012 | Hall et al. |
| 2012/0023318 A1 | 1/2012 | Xing et al. |
| 2012/0042105 A1 | 2/2012 | Maeda et al. |
| 2012/0042126 A1 | 2/2012 | Krick et al. |
| 2012/0066483 A1 | 3/2012 | Boury et al. |
| 2012/0089812 A1 | 4/2012 | Smith |
| 2012/0096204 A1 | 4/2012 | Auerbach et al. |
| 2012/0198209 A1 | 8/2012 | Abdallah et al. |
| 2012/0246450 A1 | 9/2012 | Abdallah et al. |
| 2012/0246657 A1 | 9/2012 | Abdallah et al. |
| 2012/0278593 A1 | 11/2012 | Clark et al. |
| 2013/0019047 A1 | 1/2013 | Podvalny et al. |
| 2013/0036296 A1 | 2/2013 | Hickey et al. |
| 2013/0046934 A1 | 2/2013 | Nychka et al. |
| 2013/0086417 A1 | 4/2013 | Sivaramakrishnan et al. |
| 2013/0097369 A1 | 4/2013 | Talagala et al. |
| 2013/0238874 A1 | 9/2013 | Avudaiyappan et al. |
| 2013/0283286 A1 | 10/2013 | Lee et al. |
| 2013/0304991 A1 | 11/2013 | Boettcher et al. |

(56) References Cited

U.S. PATENT DOCUMENTS

| | | |
|---|---|---|
| 2013/0311759 A1 | 11/2013 | Abdallah et al. |
| 2013/0339671 A1 | 12/2013 | Williams, III et al. |
| 2013/0346699 A1 | 12/2013 | Walker |
| 2014/0032844 A1 | 1/2014 | Avudaiyappan et al. |
| 2014/0032845 A1 | 1/2014 | Avudaiyappan et al. |
| 2014/0032856 A1 | 1/2014 | Avudaiyappan et al. |
| 2014/0075168 A1 | 3/2014 | Abdallah |
| 2014/0108730 A1 | 4/2014 | Avudaiyappan et al. |
| 2014/0123145 A1 | 5/2014 | Barrow-Williams et al. |
| 2014/0156947 A1 | 6/2014 | Avudaiyappan |
| 2014/0181833 A1 | 6/2014 | Bird et al. |
| 2014/0281242 A1 | 9/2014 | Abdallah et al. |
| 2014/0281411 A1 | 9/2014 | Abdallah |
| 2014/0281412 A1 | 9/2014 | Abdallah |
| 2014/0281416 A1 | 9/2014 | Abdallah |
| 2014/0281426 A1 | 9/2014 | Abdallah et al. |
| 2014/0281427 A1 | 9/2014 | Abdallah |
| 2014/0281428 A1 | 9/2014 | Abdallah et al. |
| 2014/0281436 A1 | 9/2014 | Abdallah |
| 2014/0282592 A1 | 9/2014 | Abdallah et al. |
| 2014/0282601 A1 | 9/2014 | Abdallah |
| 2014/0317387 A1 | 10/2014 | Abdallah et al. |
| 2014/0344554 A1 | 11/2014 | Abdallah |
| 2014/0373022 A1 | 12/2014 | Chan et al. |
| 2015/0039859 A1 | 2/2015 | Abdallah |
| 2015/0046683 A1 | 2/2015 | Abdallah |
| 2015/0046686 A1 | 2/2015 | Abdallah |
| 2015/0186144 A1 | 7/2015 | Abdallah |
| 2016/0041908 A1 | 2/2016 | Avudaiyappan et al. |
| 2016/0041913 A1 | 2/2016 | Avudaiyappan et al. |
| 2016/0041930 A1 | 2/2016 | Avudaiyappan |
| 2016/0154653 A1 | 6/2016 | Abdallah |
| 2016/0210145 A1 | 7/2016 | Abdallah |
| 2016/0210176 A1 | 7/2016 | Abdallah |
| 2016/0371188 A1 | 12/2016 | Abdallah |

FOREIGN PATENT DOCUMENTS

| | | |
|---|---|---|
| CN | 1451115 A | 10/2003 |
| CN | 1214666 C | 8/2005 |
| CN | 1713137 A | 12/2005 |
| CN | 1774709 A | 5/2006 |
| CN | 1841314 A | 10/2006 |
| CN | 1841332 A | 10/2006 |
| CN | 1848095 A | 10/2006 |
| CN | 1881223 A | 12/2006 |
| CN | 101114218 A | 1/2008 |
| CN | 101151594 A | 3/2008 |
| CN | 101241428 A | 8/2008 |
| CN | 101344840 A | 1/2009 |
| CN | 101449256 A | 6/2009 |
| CN | 101582025 A | 11/2009 |
| CN | 101627365 A | 1/2010 |
| CN | 101916180 A | 12/2010 |
| CN | 102105864 A | 6/2011 |
| EP | 0596636 A2 | 5/1994 |
| EP | 0706133 A2 | 4/1996 |
| EP | 2616928 A2 | 7/2013 |
| GB | 2343270 A | 5/2000 |
| JP | 2000330790 A | 11/2000 |
| KR | 20010050794 A | 6/2001 |
| KR | 20010053622 | 6/2001 |
| KR | 20100003309 A | 1/2010 |
| TW | 200707284 | 3/1995 |
| TW | 539996 B | 7/2003 |
| TW | 544626 B | 8/2003 |
| TW | 200401187 A | 1/2004 |
| TW | 200405201 A | 4/2004 |
| TW | 591530 B | 6/2004 |
| TW | 200422949 A | 11/2004 |
| TW | I233545 B | 6/2005 |
| TW | I281121 B | 5/2007 |
| TW | 200813766 A | 3/2008 |
| TW | 200844853 A | 11/2008 |
| TW | 200941339 A | 10/2009 |
| TW | I315488 B | 10/2009 |
| TW | 200949690 A | 12/2009 |
| TW | I329437 B | 8/2010 |
| TW | I331282 B | 10/2010 |
| TW | I352288 B | 11/2011 |
| TW | 201227520 A | 7/2012 |
| TW | 201241744 A | 10/2012 |
| TW | 201305819 A | 2/2013 |
| WO | 9750031 A1 | 12/1997 |
| WO | 9919793 A1 | 4/1999 |
| WO | 0125921 A1 | 4/2001 |
| WO | 2004114128 A2 | 12/2004 |
| WO | 2007027671 A2 | 3/2007 |
| WO | 2008021434 A1 | 2/2008 |
| WO | 2008061154 A2 | 5/2008 |
| WO | 2009012296 A2 | 1/2009 |
| WO | 2009101563 A1 | 8/2009 |
| WO | 2010049585 A1 | 5/2010 |
| WO | 2012135031 A2 | 10/2012 |
| WO | 2012135050 A2 | 10/2012 |

OTHER PUBLICATIONS

Non-final Office Action from U.S. Appl. No. 15/357,943, dated Aug. 25, 2017, 111 pages.
Notice of Allowance and Search Report from foreign counterpart Taiwan Patent Application No. 103109479, dated Nov. 30, 2017, 4 pages. (Translation available only for Search report).
Notice of Allowance from foreign counterpart Chinese Patent Application No. 200780046679, dated Feb. 6, 2017, 8 pages.
Notice of Allowance from foreign counterpart Korean Patent Application No. 10-2015-7029262, dated Aug. 31, 2017, 3 pages.
Notice of Allowance from foreign counterpart Korean Patent Application No. 10-2016-7017150, dated Oct. 30, 2017, 3 pages.
Notice of Allowance from foreign counterpart Korean Patent Application No. 10-2017-7002379, dated Dec. 20, 2017, 3 pages.
Notice of Allowance from foreign counterpart Korean Patent Application No. 10-2017-7002473, dated Dec. 20, 2017, 6 pages.
Notice of Allowance from foreign counterpart Korean Patent Application No. 20137027841, dated Mar. 31, 2016, 2 pages.
Notice of Allowance from U.S. Appl. No. 12/296,919, dated Jul. 27, 2012, 6 pages.
Notice of Allowance from U.S. Appl. No. 12/514,303, dated Oct. 25, 2013, 12 pages.
Notice of Allowance from U.S. Appl. No. 13/428,438, dated Apr. 13, 2017, 62 pages.
Notice of Allowance from U.S. Appl. No. 13/428,438, dated Aug. 7, 2017, 42 pages.
Notice of Allowance from U.S. Appl. No. 13/428,438, dated Aug. 10, 2016, 9 pages.
Notice of Allowance from U.S. Appl. No. 13/428,438, dated Dec. 29, 2016, 9 pages.
Notice of Allowance from U.S. Appl. No. 13/428,438, dated Mar. 4, 2016, 14 pages.
Notice of Allowance from U.S. Appl. No. 13/428,438, dated Nov. 6, 2015, 9 pages.
Notice of Allowance from U.S. Appl. No. 13/428,440, dated Apr. 20, 2017, 46 pages.
Notice of Allowance from U.S. Appl. No. 13/428,440, dated Feb. 26, 2016, 10 pages.
Notice of Allowance from U.S. Appl. No. 13/428,440, dated Mar. 10, 2017, 52 pages.
Notice of Allowance from U.S. Appl. No. 13/428,440, dated Nov. 16, 2016, 9 pages.
Notice of Allowance from U.S. Appl. No. 13/428,440, dated Nov. 20, 2015, 9 pages.
Notice of Allowance from U.S. Appl. No. 13/428,452, dated Oct. 21, 2015, 9 pages.
Notice of Allowance from U.S. Appl. No. 13/475,708, dated Jun. 16, 2017, 51 pages.
Notice of Allowance from U.S. Appl. No. 13/475,708, dated Jun. 30, 2017, 53 pages.
Notice of Allowance from U.S. Appl. No. 13/475,708, dated Mar. 17, 2017, 55 pages.

(56) References Cited

OTHER PUBLICATIONS

Notice of Allowance from U.S. Appl. No. 13/475,708, dated Nov. 27, 2017, 24 pages.
Notice of Allowance from U.S. Appl. No. 13/475,708, dated Oct. 13, 2016, 17 pages.
Notice of Allowance from U.S. Appl. No. 13/475,739, dated Aug. 3, 2016, 11 pages.
Notice of Allowance from U.S. Appl. No. 13/475,739, dated Mar. 25, 2016, 25 pages.
Notice of Allowance from U.S. Appl. No. 13/691,609, dated Aug. 6, 2014, 11 pages.
Notice of Allowance from U.S. Appl. No. 13/691,609, dated Feb. 23, 2015, 16 pages.
Notice of Allowance from U.S. Appl. No. 14/194,589, dated Jul. 27, 2016, 7 pages.
Notice of Allowance from U.S. Appl. No. 14/213,115, dated Jun. 27, 2016, 9 pages.
Notice of Allowance from U.S. Appl. No. 14/213,115, dated Oct. 3, 2016, 20 pages.
Notice of Allowance from U.S. Appl. No. 14/213,135, dated Aug. 3, 2017, 103 pages.
Notice of Allowance from U.S. Appl. No. 14/213,135, dated Oct. 17, 2016, 17 pages.
Notice of Allowance from U.S. Appl. No. 14/213,218, dated Jun. 16, 2017, 89 pages.
Notice of Allowance from U.S. Appl. No. 14/213,692, dated Dec. 23, 2016, 19 pages.
Notice of Allowance from U.S. Appl. No. 14/213,692, dated Sep. 28, 2017, 112 pages.
Notice of Allowance from U.S. Appl. No. 14/213,730, dated Aug. 31, 2017, 96 pages.
Notice of Allowance from U.S. Appl. No. 14/213,730, dated Oct. 27, 2016, 16 pages.
Notice of Allowance from U.S. Appl. No. 14/213,854, dated Oct. 7, 2016, 19 pages.
Notice of Allowance from U.S. Appl. No. 14/214,045, dated Apr. 18, 2017, 88 pages.
Notice of Allowance from U.S. Appl. No. 14/214,045, dated Oct. 6, 2017, 137 pages.
Notice of Allowance from U.S. Appl. No. 14/214,176, dated May 10, 2017, 88 pages.
Notice of Allowance from U.S. Appl. No. 14/214,176, dated Oct. 19, 2017, 25 pages.
Notice of Allowance from U.S. Appl. No. 14/214,280, dated Jun. 29, 2017, 86 pages.
Notice of Allowance from U.S. Appl. No. 14/215,633, dated Jun. 30, 2017, 83 pages.
Notice of Allowance from U.S. Appl. No. 14/215,633, dated Mar. 23, 2017, 17 pages.
Notice of Allowance from U.S. Appl. No. 14/215,633, dated May 23, 2016, 9 pages.
Final Office Action from U.S. Appl. No. 12/296,919, dated Oct. 22, 2010, 7 pages.
Final Office Action from U.S. Appl. No. 12/514,303, dated Jan. 24, 2013, 11 pages.
Final Office Action from U.S. Appl. No. 13/428,438, dated Dec. 24, 2014, 17 pages.
Final Office Action from U.S. Appl. No. 13/428,440, dated Dec. 24, 2014, 19 pages.
Final Office Action from U.S. Appl. No. 13/428,452, dated Dec. 24, 2014, 20 pages.
Final Office Action from U.S. Appl. No. 13/475,708, dated Jun. 9, 2016, 35 pages.
Final Office Action from U.S. Appl. No. 13/475,708, dated May 8, 2015, 23 pages.
Final Office Action from U.S. Appl. No. 13/475,739, dated Feb. 4, 2015, 12 pages.
Final Office Action from U.S. Appl. No. 13/475,739, dated Nov. 23, 2015, 28 pages.
Final Office Action from U.S. Appl. No. 14/194,589, dated Apr. 19, 2016, 7 pages.
Final Office Action from U.S. Appl. No. 14/212,203, dated Dec. 13, 2016, 20 pages.
Final Office Action from U.S. Appl. No. 14/212,203, dated Sep. 12, 2017, 84 pages.
Final Office Action from U.S. Appl. No. 14/212,533, dated Jan. 4, 2017, 27 pages.
Final Office Action from U.S. Appl. No. 14/212,533, dated Sep. 8, 2017, 69 pages.
Final Office Action from U.S. Appl. No. 14/213,115, dated Feb. 3, 2015, 11 pages.
Final Office Action from U.S. Appl. No. 14/213,115, dated Mar. 7, 2016, 18 pages.
Final Office Action from U.S. Appl. No. 14/213,135, dated Oct. 26, 2015, 20 pages.
Final Office Action from U.S. Appl. No. 14/213,218, dated Jul. 6, 2016, 24 pages.
Final Office Action from U.S. Appl. No. 14/213,218, dated Jul. 22, 2015, 16 pages.
Final Office Action from U.S. Appl. No. 14/213,692, dated Jan. 20, 2016, 18 pages.
Final Office Action from U.S. Appl. No. 14/213,730, dated May 11, 2016, 14 pages.
Final Office Action from U.S. Appl. No. 14/213,854, dated Nov. 9, 2015, 19 pages.
Final Office Action from U.S. Appl. No. 14/214,045, dated Aug. 29, 2016, 14 pages.
Final Office Action from U.S. Appl. No. 14/214,176, dated Aug. 29, 2016, 17 pages.
Final Office Action from U.S. Appl. No. 14/214,280, dated Mar. 6, 2017, 12 pages.
Final Office Action from U.S. Appl. No. 14/214,280, dated Mar. 11, 2016, 18 pages.
Final Office Action from U.S. Appl. No. 14/214,280, dated Oct. 24, 2016, 20 pages.
Final Office Action from U.S. Appl. No. 14/216,493, dated Aug. 30, 2016, 21 pages.
Final Office Action from U.S. Appl. No. 14/216,493, dated May 22, 2017, 17 pages.
Final Office Action from U.S. Appl. No. 14/216,859, dated Jun. 9, 2016, 16 pages.
Final Office Action from U.S. Appl. No. 14/360,280, dated Aug. 10, 2017, 103 pages.
Final Office Action from U.S. Appl. No. 14/360,282, dated Feb. 16, 2017, 10 pages.
Final Office Action from U.S. Appl. No. 14/360,282, dated Oct. 4, 2017, 22 pages.
Final Office Action from U.S. Appl. No. 14/360,284, dated Mar. 1, 2017, 10 pages.
Final Office Action from U.S. Appl. No. 15/219,063, dated Nov. 20, 2017, 27 pages.
Final Office Action from U.S. Appl. No. 15/354,742, dated Nov. 29, 2017, 20 pages.
Final Office Action from U.S. Appl. No. 15/354,857, dated Nov. 28, 2017, 23 pages.
First Office Action and Search report from foreign counterpart China Patent Application No. 201180076248.0, dated Mar. 17, 2016, 25 pages.
First Office Action and Search Report from foreign counterpart China Patent Application No. 201480024463.X, dated Apr. 1, 2017, 31 pages (Translation available only for office action).
First Office Action and Search report from foreign counterpart Chinese Patent Application No. 201180076244.2, dated Mar. 22, 2016, 18 pages (Translation available only for Office Action).
First Office Action from foreign counterpart China Patent Application No. 201180076245.7, dated Mar. 21, 2016, 10 pages.
First Office Action from foreign counterpart China Patent Application No. 201280024012.7, dated May 30, 2016, 21 pages.
First Office Action from foreign counterpart China Patent Application No. CN201280034725, dated Oct. 26, 2015, 26 pages.
First Office Action from foreign counterpart China Patent Application No. CN201280034739, dated Nov. 3, 2015, 39 pages.

(56) References Cited

OTHER PUBLICATIONS

First Office Action from foreign counterpart China Patent Application No. CN201310589048, dated Feb. 2, 2016, 8 pages.
First Office Action from foreign counterpart Chinese Patent Application No. 201280024054.0, dated May 30, 2016, 24 pages.
First Office Action from foreign counterpart Chinese patent application No. 201280024095, dated May 26, 2016, 32 pages.
Fourth Office Action and Search report from foreign counterpart China Patent Application No. 201180076248.0, dated Nov. 9, 2017, 38 pages. (Translation available only for office action).
Franklin, et al., "The Expandable Split Window Paradigm for Exploiting Fine-Grain Parallelism," ACM SIGARCH Computer Architecture News—Special Issue: Proceedings of the 19th annual international symposium on Computer architecture (ISCA '92), Association for Computing Machinery (ACM), New York, NY, vol. 20 (2), May 1992, pp. 58-67.
Garmany J., "The Power of Indexing: Oracle Tips by Burleson Consulting," Burleson Enterprises, Inc., archived on Mar. 9, 2009, retrieved Sep. 17, 2015 via Internet: web.archive.org/web/20090309201136/http://dba-oracle.com/t_indexing_power.htm, 7 pages.
Grant of Patent for Korean Application No. 10-2014-7016763, dated Oct. 31, 2016, 2 pages.
Grant of Patent for Korean Application No. 10-2015-7028745, dated Nov. 30, 2016, 2 pages.
Hu, et al., "An Approach for Implementing Efficient Superscalar CISC Processors," High Performance Computer Architecture, 2006, Twelfth International Symposium on Austin, Texas Feb. 11-15, 2006, pp. 40-51.
Intel "Programming on Intel® Platform," The edition team of Intel® Software College course book, Shanghai Jiao Tong University Press, published Jan. 31, 2011, pp. 175-180.
Intention to Grant a patent for European Application No. 07811845, dated Mar. 31, 2016, 58 pages.
Intention to Grant a patent for European Application No. 12150513, dated Mar. 15, 2016, 59 pages.
International Preliminary Report on Patentability and for Application No. PCT/US2007/084710, dated May 19, 2009, 4 pages.
International Preliminary Report on Patentability and Written Opinion for Application No. PCT/US2007/066536, dated Oct. 14, 2008, 6 pages.
International Preliminary Report on Patentability and Written Opinion for Application No. PCT/US2012/038711, dated Nov. 20, 2013, 5 pages.
International Preliminary Report on Patentability and Written Opinion for Application No. PCT/US2012/038713, dated Nov. 20, 2013, 5 pages.
International Preliminary Report on Patentability for Application No. PCT/US2011/051992, dated Mar. 28, 2013, 8 pages.
International Preliminary Report on Patentability for Application No. PCT/US2011/061940, dated Jun. 5, 2014, 6 pages.
International Preliminary Report on Patentability for Application No. PCT/US2011/061953, dated Jun. 5, 2014, 7 pages.
International Preliminary Report on Patentability for Application No. PCT/US2011/061957, dated Jun. 5, 2014, 7 pages.
International Preliminary Report on Patentability for Application No. PCT/US2012/030383, dated Oct. 10, 2013, 6 pages.
International Preliminary Report on Patentability for Application No. PCT/US2012/030409, dated Oct. 10, 2013, 6 pages.
International Preliminary Report on Patentability for Application No. PCT/US2012/30360, dated Oct. 10, 2013, 6 pages.
International Preliminary Report on Patentability for Application No. PCT/US2014/024276, dated Sep. 24, 2015, 6 pages.
International Preliminary Report on Patentability for Application No. PCT/US2014/024608, dated Sep. 24, 2015, 8 pages.
International Preliminary Report on Patentability for Application No. PCT/US2014/024677, dated Sep. 24, 2015, 7 pages.
International Preliminary Report on Patentability for Application No. PCT/US2014/024722, dated Sep. 24, 2015, 6 pages.
International Preliminary Report on Patentability for Application No. PCT/US2014/024775, dated Sep. 24, 2015, 6 pages.
International Preliminary Report on Patentability for Application No. PCT/US2014/024828, dated Sep. 24, 2015, 8 pages.
International Search Report and Written Opinion for Application No. PCT/US2007/084710, dated May 22, 2008, 6 pages.
International Search Report and Written Opinion for Application No. PCT/US2011/051992, dated Mar. 28, 2012, 11 pages.
International Search Report and Written Opinion for Application No. PCT/US2011/061940, dated Jul. 20, 2012, 8 pages.
International Search Report and Written Opinion for Application No. PCT/US2011/061953, dated Jul. 24, 2012, 8 pages.
International Search Report and Written Opinion for Application No. PCT/US2011/061957, dated Jul. 20, 2012, 8 pages.
International Search Report and Written Opinion for Application No. PCT/US2012/030383, dated Oct. 25, 2012, 8 pages.
International Search Report and Written Opinion for Application No. PCT/US2012/030409, dated Oct. 12, 2012, 7 pages.
International Search Report and Written opinion for Application No. PCT/US2012/038711, dated Nov. 28, 2012, 7 pages.
International Search Report and Written Opinion for Application No. PCT/US2012/038713, dated Oct. 29, 2012, 7 pages.
International Search Report and Written Opinion for Application No. PCT/US2012/30360, dated Oct. 29, 2012, 7 pages.
International Search Report and Written Opinion for Application No. PCT/US2014/024276, dated Jul. 31, 2014, 7 pages.
International Search Report and Written Opinion for Application No. PCT/US2014/024608, dated Jul. 31, 2014, 9 pages.
International Search Report and Written Opinion for Application No. PCT/US2014/024677, dated Jun. 30, 2014, 9 pages.
International Search Report and Written Opinion for Application No. PCT/US2014/024722, dated Jun. 27, 2014, 7 pages.
International Search Report and Written Opinion for Application No. PCT/US2014/024775, dated Jun. 2, 2014, 7 pages.
International Search Report and Written Opinion for Application No. PCT/US2014/024828, dated Jul. 28, 2014, 9 pages.
International Search Report for Application No. PCT/US2007/066536, dated Jul. 30, 2008, 2 pages.
Jacobson, et al., "Path-based Next Trace Prediction," Micro 30—Proceedings of the 30th Annual IEEE/ACM International Symposium on Microarchitecture, Dec. 1-3, 1997, IEEE Computer Society, Washington, D.C., 1997, pp. 14-23.
Kozyrakis, et al., "A New Direction for Computer Architecture Research," Computer, IEEE Computer Society Press, Los Alamitos, CA, Nov. 1, 1998, vol. 31 (11), pp. 24-32.
Mogul J.C., et al., "Potential Benefits of Delta Encoding and Data Compression for HTTP," Oct. 1, 1997, ACM, SIGCOMM '97, pp. 181-194.
Nagarajan et al., "A Design Space Evaluation of Grid Processor Architectures," 34th ACM/IEEE International Symposium, Piscataway, NJ, Dec. 1-5, 2001, pp. 40-51.
Nanda, et al., "The Misprediction Recovery Cache," International Journal of Parallel Programming—Special issue: Micro-29, 29th annual IEEE/ACM international symposium on microarchitecture, Plenum Press, New York, NY, Aug. 1998, vol. 26 (4), pp. 383-415.
Non-Final Office Action from U.S. Appl. No. 12/296,919, dated Apr. 7, 2011, 8 pages.
Non-Final Office Action from U.S. Appl. No. 12/296,919, dated Jun. 14, 2010, 7 pages.
Non-Final Office Action from U.S. Appl. No. 12/296,919, dated Mar. 7, 2012, 7 pages.
Non-Final Office Action from U.S. Appl. No. 12/514,303, dated Jun. 27, 2013, 7 pages.
Non-Final Office Action from U.S. Appl. No. 12/514,303, dated May 10, 2012, 9 pages.
Search Report for Chinese Application No. CN201280024012, dated May 19, 2016, 2 pages.
Second Office Action from foreign counterpart China Patent Application No. 201180076248.0, dated Oct. 20, 2016, 25 pages.
Second Office Action from foreign counterpart China Patent Application No. 201480024463.X, dated Nov. 14, 2017, 34 pages.
Second Office Action from foreign counterpart China Patent Application No. CN201280034725, dated Apr. 14, 2016, 8 pages.
Second Office Action from foreign counterpart China Patent Application No. CN201280034739, dated Jun. 23, 2016, 44 pages.

(56) References Cited

OTHER PUBLICATIONS

Second Office Action from foreign counterpart Chinese Patent Application No. 201280024054.0, dated Dec. 26, 2016, 11 pages.
Second Office Action with search report from foreign counterpart Chinese Patent Application No. 201180076244, dated Nov. 18, 2016, 21 pages (Translation available only for Office Action).
Summons to attend Oral Proceedings for European Application No. 070864410, dated Apr. 3, 2013, 3 pages.
Sun, et al., "Modeling of FPGA Local/Global Interconnect Resources and Derivation of Minimal Test Configuration," Proceedings of the 17th IEEE International Symposium on Defect and Fault Tolerance in VLSI Systems (DFT'02), IEEE Computer Society, Nov. 6-8, 2002, 9 pages.
Third Office Action and Search report from foreign counterpart China Patent Application No. 201180076248.0, dated May 2, 2017, 27 pages.
Third Office Action from foreign counterpart China Patent Application No. 201280024054.0, dated Jul. 28, 2017, 8 pages.
Third Office Action from foreign counterpart Chinese Patent Application No. 201180076244.2, dated May 2, 2017, 20 pages.
Third Office Action from foreign counterpart Chinese Patent Application No. 201280024012.7, dated Nov. 6, 2017, 8 pages.
Third Office Action from foreign counterpart Chinese Patent Application No. 201280034739, dated Dec. 27, 2016, 18 pages.
Wallace S., et al.,"Multiple Branch and Block Prediction," Third International symposium on High-Performance Computer Architecture, IEEE, Feb. 1997, pp. 94-103.
Written Opinion for Application No. PCT/US2007/066536, dated Jul. 30, 2008, 5 pages.
Ye, et al., "A New Recovery Mechanism in Superscalar Microprocessors by Recovering Critical Misprediction," IEICE Transactions on Fundamentals of Electronics, Communications and Computer Sciences, The Institute of Electronics, Information and Communication Engineers, Dec. 1, 2011, vol. E94-A (12), pp. 2639-2648.
Yeh, et al., "Increasing the Instruction Fetch Rate Via Multiple Branch Prediction and a Branch Address Cache," ICS 93, Proceedings of the 7th International Conference on Supercomputing, ACM, New York, NY, Jul. 19-23, 1993, pp. 67-76.
Non-Final Office Action from U.S. Appl. No. 13/428,438, dated Apr. 24, 2014, 15 pages.
Non-Final Office Action from U.S. Appl. No. 13/428,438, dated May 1, 2015, 12 pages.
Non-Final Office Action from U.S. Appl. No. 13/428,440, dated Jun. 18, 2014, 16 pages.
Non-Final Office Action from U.S. Appl. No. 13/428,440, dated May 4, 2015, 13 pages.
Non-Final Office Action from U.S. Appl. No. 13/428,452, dated Apr. 23, 2015, 11 pages.
Non-Final Office Action from U.S. Appl. No. 13/428,452, dated Apr. 28, 2014, 21 pages.
Non-Final Office Action from U.S. Appl. No. 13/475,708, dated Feb. 11, 2015, 27 pages.
Non-Final Office Action from U.S. Appl. No. 13/475,708, dated Feb. 12, 2016, 37 pages.
Non-Final Office Action from U.S. Appl. No. 13/475,739, dated May 21, 2015, 14 pages.
Non-Final Office Action from U.S. Appl. No. 13/475,739, dated Sep. 2, 2014, 15 pages.
Non-Final Office Action from U.S. Appl. No. 13/691,609, dated Jan. 15, 2014, 5 pages.
Non-Final Office Action from U.S. Appl. No. 13/691,609, dated Sep. 5, 2013, 11 pages.
Non-Final Office Action from U.S. Appl. No. 14/194,589, dated Nov. 19, 2015, 12 pages.
Non-Final Office Action from U.S. Appl. No. 14/212,203, dated Mar. 24, 2017, 68 pages.
Non-Final Office Action from U.S. Appl. No. 14/212,203, dated Sep. 8, 2016, 52 pages.
Non-Final Office Action from U.S. Appl. No. 14/212,533, dated Apr. 20, 2017, 116 pages.
Non-Final Office Action from U.S. Appl. No. 14/212,533, dated Sep. 22, 2016, 52 pages.
Non-Final Office Action from U.S. Appl. No. 14/213,115, dated Oct. 19, 2015, 24 pages.
Non-Final Office Action from U.S. Appl. No. 14/213,115, dated Sep. 22, 2014, 19 pages.
Non-Final Office Action from U.S. Appl. No. 14/213,135, dated May 14, 2015, 23 pages.
Non-Final Office Action from U.S. Appl. No. 14/213,135, dated May 31, 2016, 14 pages.
Non-Final Office Action from U.S. Appl. No. 14/213,218, dated Apr. 22, 2015, 22 pages.
Non-Final Office Action from U.S. Appl. No. 14/213,218, dated Feb. 2, 2016, 17 pages.
Non-final Office Action from U.S. Appl. No. 14/213,692, dated Aug. 24, 2015, 30 pages.
Non-final Office Action from U.S. Appl. No. 14/213,692, dated Jun. 13, 2016, 17 pages.
Non-Final Office Action from U.S. Appl. No. 14/213,730, dated Jan. 7, 2016, 27 pages.
Non-Final Office Action from U.S. Appl. No. 14/213,854, dated Apr. 29, 2016, 13 pages.
Non-Final Office Action from U.S. Appl. No. 14/213,854, dated Jun. 19, 2015, 23 pages.
Non-Final Office Action from U.S. Appl. No. 14/214,045, dated Apr. 1, 2016, 61 pages.
Non-Final Office Action from U.S. Appl. No. 14/214,045, dated Dec. 19, 2016, 88 pages.
Non-Final Office Action from U.S. Appl. No. 14/214,176, dated Jan. 6, 2017, 36 pages.
Non-Final Office Action from U.S. Appl. No. 14/214,176, dated Mar. 25, 2016, 25 pages.
Non-Final Office Action from U.S. Appl. No. 14/214,280, dated Jan. 6, 2017, 14 pages.
Non-Final Office Action from U.S. Appl. No. 14/214,280, dated Jun. 16, 2016, 12 pages.
Non-Final Office Action from U.S. Appl. No. 14/214,280, dated Sep. 18, 2015, 18 pages.
Non-Final Office Action from U.S. Appl. No. 14/215,633, dated Oct. 22, 2015, 18 pages.
Non-final Office Action from U.S. Appl. No. 14/216,493, dated Apr. 4, 2016, 26 pages.
Non-Final Office Action from U.S. Appl. No. 14/216,493, dated Mar. 29, 2017, 18 pages.
Non-Final Office Action from U.S. Appl. No. 14/216,859, dated Jan. 28, 2016, 33 pages.
Non-Final Office Action from U.S. Appl. No. 14/360,280, dated Dec. 14, 2017, 25 pages.
Non-Final Office Action from U.S. Appl. No. 14/360,280, dated Feb. 23, 2017, 34 pages.
Non-Final Office Action from U.S. Appl. No. 14/360,282, dated Jun. 22, 2017, 97 pages.
Non-Final Office Action from U.S. Appl. No. 14/360,282, dated Oct. 21, 2016, 13 pages.
Non-final Office Action from U.S. Appl. No. 14/360,284, dated Oct. 21, 2016, 32 pages.
Non-Final Office Action from U.S. Appl. No. 14/733,827, dated Apr. 28, 2017, 99 pages.
Non-Final Office Action from U.S. Appl. No. 15/082,359, dated Aug. 11, 2017, 108 pages.
Non-Final Office Action from U.S. Appl. No. 15/219,063, dated May 30, 2017, 102 pages.
Non-Final Office Action from U.S. Appl. No. 15/257,593, dated Apr. 7, 2017, 37 pages.
Non-final Office Action from U.S. Appl. No. 15/354,742, dated Aug. 25, 2017, 152 pages.
Non-Final Office Action from U.S. Appl. No. 15/354,857, dated Sep. 12, 2017, 111 pages.
Abandonment from U.S. Appl. No. 13/824,013, dated Mar. 3, 2015, 1 page.
Advisory Action from U.S. Appl. No. 12/296,919, dated Aug. 26, 2011, 3 pages.

(56) References Cited

OTHER PUBLICATIONS

Advisory Action from U.S. Appl. No. 14/214,280, dated May 15, 2017, 3 pages.
Barham P., et al., "Xen and the Art of Virtualization," Proceedings of the ACM Symposium on Operating Systems Principles, XP002298786, Oct. 2003, pp. 164-177.
Communication pursuant to Article 94(3) EPC for European Application No. 070864410, dated Mar. 16, 2012, 4 pages.
Communication pursuant to Article 94(3) EPC for European Application No. 070864410, dated Nov. 14, 2012, 4 pages.
Communication pursuant to Article 94(3) EPC for European Application No. 07811845, dated Apr. 16, 2014, 5 pages.
Communication pursuant to Article 94(3) EPC for European Application No. 07811845, dated Dec. 21, 2015, 3 pages.
Communication pursuant to Article 94(3) EPC for European Application No. 07811845, dated Feb. 3, 2014, 5 pages.
Communication pursuant to Article 94(3) EPC for European Application No. 07811845, dated Feb. 16, 2011, 6 pages.
Communication pursuant to Article 94(3) EPC for European Application No. 07811845, dated Jan. 27, 2012, 7 pages.
Communication pursuant to Article 94(3) EPC for European Application No. 12150513, dated Apr. 16, 2013, 5 pages.
Communication pursuant to Article 94(3) EPC for European Application No. 12150513, dated Dec. 21, 2015, 4 pages.
Communication pursuant to Article 94(3) EPC for European Application No. 12150513, dated May 9, 2014, 8 pages.
Communication pursuant to Article 94(3) EPC for European Application No. 12174228, dated Jun. 11, 2013, 3 pages.
Communication pursuant to Article 94(3) EPC for European Application No. 12764627, dated Oct. 4, 2016, 4 pages.
Communication pursuant to Article 94(3) EPC for European Application No. 12788989.7, dated Jun. 22, 2017, 6 pages.
Communication pursuant to Rules 161(2) and 162 EPC for Application No. 12763717, dated Nov. 22, 2013, 3 pages.
Communication pursuant to Rules 70(2) and 70a(2) EPC for Application No. 12763717, dated Oct. 10, 2014, 1 page.
Communication pursuant to Rules 70(2) and 70a(2) EPC for European Application No. 11876314.3, dated Jul. 1, 2016, 1 page.
Cooperman, "Cache Basics," Winter 2003, downloaded from http://www.ccs.neu.edu/course/com3200/parent/NOTES/cache-basics.html on Sep. 24, 2015, 3 pages. (no publication month available).
Decision to Grant a Patent for European Application No. 07811845, dated Jun. 16, 2016, 2 pages.
Decision to Grant a Patent for European Application No. 12150513, dated Jun. 16, 2016, 2 pages.
Decision to Grant a Patent for European Application No. 12174228, dated Dec. 13, 2013, 5 pages.
Decision to Grant a Patent for Korean Application No. KR1020137027843, dated Apr. 29, 2016, 2 pages.
Decision to Grant a Patent for Korean Patent Application No. 20137027842, dated Mar. 31, 2016, 2 pages.
Decision to grant a patent from foreign counterpart Korean Patent Application No. 10-2014-7016774, dated Jul. 25, 2016, 2 pages.
Decision to Grant a Patent from foreign counterpart Korean Patent Application No. 20137033565, dated Apr. 29, 2016, 2 pages.
Decision to Grant a Patent from foreign counterpart Korean Patent Application No. 20137033566, dated Apr. 29, 2016, 2 pages.
Decision to Grant a Patent from foreign counterpart Korean Patent Application No. KR1020157029107, dated Apr. 25, 2017, 2 pages.
Examination Report for European Application No. 12763717, dated Nov. 28, 2016, 5 pages.
Extended European Search Report for Application No. 07811845.2, dated Nov. 2, 2009, 7 pages.
Extended European Search Report for Application No. 07864410, dated Feb. 19, 2010, 8 pages.
Extended European Search Report for Application No. 11876314.3, dated Jun. 14, 2016, 6 pages.
Extended European Search Report for Application No. 12150513, dated Jun. 19, 2012, 8 pages.
Extended European Search Report for Application No. 12174228, dated Oct. 16, 2012, 4 pages.
Extended European Search Report for Application No. 12174229, dated Jul. 4, 2014, 10 pages.
Extended European Search Report for Application No. 12788989, dated May 12, 2016, 9 pages.
Extended European Search Report for Application No. 12789667, dated Feb. 26, 2016, 7 pages.
Extended European Search Report for Application No. 14769411.1, dated Apr. 5, 2017, 8 pages.
Extended European Search Report for Application No. 14769450.9, dated Feb. 21, 2017, 16 pages.
Extended European Search Report for Application No. 14770976.0, dated Jul. 3, 2017, 9 pages.
Extended European Search Report for Application No. 16196777.3, dated Mar. 20, 2017, 6 pages.
Extended European Search Report for Application No. EP11826042, dated Jan. 24, 2014, 6 pages.
Extended European Search Report for Application No. EP11876128, dated Jun. 21, 2016, 8 pages.
Extended European Search Report for Application No. EP11876130, dated Jun. 1, 2016, 7 pages.
Extended European Search Report for Application No. EP12763717, dated Sep. 24, 2014, 5 pages.
Extended European Search Report for Application No. EP12764627, dated Jul. 10, 2014, 5 pages.
Extended European Search Report for Application No. EP12764838, dated Jul. 10, 2014, 5 pages.
Final Office Action from U.S. Appl. No. 12/296,919, dated Jun. 14, 2011, 7 pages.
Notice of Allowance from U.S. Appl. No. 14/215,633, dated Oct. 4, 2017, 15 pages.
Notice of Allowance from U.S. Appl. No. 14/215,633, dated Sep. 29, 2016, 13 pages.
Notice of Allowance from U.S. Appl. No. 14/216,493, dated Aug. 4, 2017, 95 pages.
Notice of Allowance from U.S. Appl. No. 14/216,859, dated Dec. 1, 2017, 113 pages.
Notice of Allowance from U.S. Appl. No. 14/216,859, dated Jan. 24, 2017, 17 pages.
Notice of Allowance from U.S. Appl. No. 14/360,284, dated Jun. 14, 2017, 100 pages.
Notice of Allowance from U.S. Appl. No. 14/733,827, dated Sep. 22, 2017, 30 pages.
Notice of Allowance from U.S. Appl. No. 15/019,920, dated Dec. 6, 2017, 24 pages.
Notice of Allowance from U.S. Appl. No. 15/019,920, dated Jul. 14, 2017, 100 pages.
Notice of Allowance from U.S. Appl. No. 15/082,867, dated Dec. 22, 2017, 25 pages.
Notice of Allowance from U.S. Appl. No. 15/082,867, dated Jul. 7, 2017, 98 pages.
Notice of Allowance from U.S. Appl. No. 15/257,593, dated Oct. 11, 2017, 95 pages.
Notice of Final Rejection from foreign counterpart Korean Patent Application No. 10-2015-7029262, dated May 23, 2017, 7 pages.
Notice of Preliminary Rejection from foreign counterpart Korean Patent Application No. 10-2016-7017150, dated Apr. 20, 2017, 5 pages.
Notice on Grant of Patent Right for Invention from foreign counterpart China Application No. 201180076244.2, dated Aug. 28, 2017, 4 pages.
Notice on Grant of Patent Right for Invention from foreign counterpart Chinese Patent Application No. 201280024054.0, dated Dec. 1, 2017, 4 pages.
Notice on Grant of Patent Right for Invention from foreign counterpart Chinese Patent Application No. 201280024095.X, dated Nov. 7, 2017, 6 pages.
Notification of Reason for Refusal from Foreign Counterpart Korean Patent Application No. 10-2013-7027842, dated Sep. 18, 2015, 7 pages.

(56) References Cited

OTHER PUBLICATIONS

Notification of Reason for Refusal from foreign counterpart Korean Patent Application No. 10-2014-7016774, dated Jan. 28, 2016, 4 pages.
Notification of Reason for Refusal from foreign counterpart Korean Patent Application No. 10-2015-7029262, dated Oct. 17, 2016, 12 pages.
Notification of Reason for Refusal from foreign counterpart Korean Patent Application No. 10-2017-7002379, dated May 26, 2017, 6 pages.
Notification of Reason for Refusal from foreign counterpart Korean Patent Application No. 10-2017-7002473, dated May 26, 2017, 7 pages.
Notification of Reason for Refusal from foreign counterpart Korean Patent Application No. 20137027841, dated Sep. 18, 2015, 10 pages.
Notification of Reason for Refusal from foreign counterpart Korean Patent Application No. 20137033565, dated Sep. 30, 2015, 6 pages.
Notification of Reason for Refusal from foreign counterpart Korean Patent Application No. 20137033566, dated Sep. 30, 2015, 9 pages.
Notification of Reason for Refusal from foreign counterpart Korean Patent Application No. KR1020137027843, dated Sep. 30, 2015, 8 pages.
Notification of Reason for Refusal from foreign counterpart Korean Patent Application No. KR1020157029107, dated Oct. 13, 2016, 11 pages.
Notification of Reason for Refusal from Korean Application No. 10-2014-7016763, dated Apr. 29, 2016, 11 pages.
Notification of Reason for Refusal from Korean Application No. 10-2015-7028745, dated May 23, 2016, 8 pages.
Notification to Grant Patent Right for Invention from foreign counterpart China Patent Application No. 201180076245.7, dated Nov. 2, 2016, 3 pages.
Notification to Grant Patent Right for Invention from foreign counterpart China Patent Application No. CN201280034725, dated Aug. 12, 2016, 3 pages.
Notification to Grant Patent Right for Invention from foreign counterpart China Patent Application No. CN201310589048, dated May 5, 2016, 3 pages.
Nuth et al., "The Named-State Register File: Implementation and Performance," High-Performance Computer Architecture, First IEEE Symposium, Jan. 22-25, 1995, 10 pages.
Office Action and Search Report from foreign counterpart Taiwan Patent Application No. 100142885, dated Jan. 23, 2017, 12 pages.
Office Action and Search Report from foreign counterpart Taiwan Patent Application No. 101117854, dated Mar. 30, 2017, 7 pages.
Office Action from foreign counterpart Chinese Patent Application No. 200780046679, dated May 21, 2013, 14 pages.
Office Action from foreign counterpart Chinese patent application No. 201280024012, dated Feb. 3, 2017, 20 pages.
Office Action from foreign counterpart Chinese patent application No. 201280024095, dated Feb. 4, 2017, 31 pages.
Office Action from foreign counterpart European Patent Application No. EP12764838, dated Oct. 4, 2016, 4 pages.
Office Action from foreign counterpart Taiwan Patent Application No. 20140109479, dated Nov. 28, 2016, 7 pages.
Partial European Search Report for Application No. 12174229, dated Oct. 10, 2012, 7 pages.
Partial Supplementary European Search Report for Application No. 14769450.9, dated Oct. 11, 2016, 8 pages.
Partial Supplementary European Search Report for Application No. EP14770976.0, dated Mar. 24, 2017, 7 pages.
Restriction Requirement from U.S. Appl. No. 12/296,919, dated Feb. 8, 2011, 4 pages.
Restriction Requirement from U.S. Appl. No. 12/514,303, dated Oct. 15, 2012, 4 pages.
Restriction Requirement from U.S. Appl. No. 14/360,282, dated Jul. 28, 2016, 4 pages.

Rixner, et al., "Register Organization for Media Processing," HPCA-6—Proceedings of the 6th International Symposium on High-Performance Computer Architecture, Jan. 8-12, 2000, IEEE, Toulouse, France, pp. 375-386.
Rotenberg E., et al., "Trace Cache: a Low Latency Approach to High Bandwidth Instruction Fetching," Micro 29—Proceedings of the 29th annual ACM/IEEE international symposium on Microarchitecture, IEEE Computer Society, Apr. 11, 1996, 48 pages.
Santos, et al., "The 2D-VLIW Architecture," Technical Report IC-06-006, Instituto de Computacao, Universidad Estadual de Campinas, Mar. 2006, 13 pages.
Sassone et al., "Dynamic Strands: Collapsing Speculative Dependence Chains for Reducing Pipeline Communication," Microarchitecture, IEEE, 37th International Symposium on Portland, USA Dec. 2004, pp. 7-17, Piscataway, NJ, USA.
Abandonment from U.S. Appl. No. 14/212,203, mailed Jul. 26, 2018, 2 pages.
Abandonment from U.S. Appl. No. 15/354,857, mailed Jul. 30, 2018, 2 pages.
Final Office Action from U.S. Appl. No. 14/360,280, dated Jul. 24, 2018, 24 pages.
Notice of Allowance from U.S. Appl. No. 13/824,013, dated Jul. 23, 2018, 15 pages.
Notice of Allowance from U.S. Appl. No. 14/216,493, dated Aug. 1, 2018, 14 pages.
Notice of Allowance from U.S. Appl. No. 15/408,255, dated Jul. 25, 2018, 136 pages.
Abandonment from U.S. Appl. No. 14/212,533, mailed Jun. 19, 2018, 3 pages.
Abandonment from U.S. Appl. No. 14/360,282, mailed May 25, 2018, 2 pages.
Advisory Action from U.S. Appl. No. 14/212,203, dated Apr. 5, 2018, 8 pages.
Communication pursuant to Article 94(3) EPC for Application No. 14770976.0, dated Mar. 16, 2018, 4 pages.
Communication pursuant to Article 94(3) EPC for Application No. 11876128.7, dated Feb. 5, 2018, 9 pages.
Communication pursuant to Article 94(3) EPC for Application No. 11876130.3, dated Feb. 5, 2018, 9 pages.
Communication pursuant to Article 94(3) EPC for Application No. 11876314.3, dated Feb. 5, 2018, 8 pages.
Communication pursuant to Article 94(3) EPC for Application No. 12789667.8, dated Feb. 21, 2018, 4 pages.
Corrected Notice of Allowance from U.S. Appl. No. 15/219,063, dated Jun. 28, 2018, 8 pages.
Corrected Notice of Allowance from U.S. Appl. No. 15/357,943, dated Apr. 2, 2018, 4 pages.
Non-Final Office Action from U.S. Appl. No. 15/712,017, dated May 7, 2018, 127 pages.
Notice of Allowance from U.S. Appl. No. 14/216,493, dated Apr. 2, 2018, 22 pages.
Notice of Preliminary Rejection from foreign counterpart Korean Patent Application No. 10-2018-7003058, dated Jun. 4, 2018, 10 pages.
Advisory Action from U.S. Appl. No. 14/360,282, dated Jan. 23, 2018, 2 pages.
Corrected Notice of Allowance from U.S. Appl. No. 13/475,708, dated Feb. 14, 2018, 27 pages.
Corrected Notice of Allowance from U.S. Appl. No. 13/475,708, dated Feb. 26, 2018, 31 pages.
Final Office Action from U.S. Appl. No. 15/082,359, dated Jan. 31, 2018, 22 pages.
First Office Action and Search Report from foreign counterpart Chinese Patent Application No. 201480024528.0, dated Jan. 26, 2018, 19 pages.
First Office Action and Search Report from foreign counterpart Chinese Patent Application No. 201480024832.5, dated Feb. 6, 2018, 15 pages. (Translation available only for office action).
Intention to grant from foreign counterpart European Patent Application No. 12788989.7, dated Feb. 23, 2018, 47 pages.
Non-Final Office Action from U.S. Appl. No. 13/824,013, dated Feb. 7, 2018, 141 pages.

(56) References Cited

OTHER PUBLICATIONS

Notice of Allowance from U.S. Appl. No. 15/082,359, dated Mar. 21, 2018, 9 pages.
Notice of Allowance from U.S. Appl. No. 15/219,063, dated Mar. 19, 2018, 28 pages.
Notice of Allowance from U.S. Appl. No. 15/357,943, dated Jan. 16, 2018, 16 pages.
Notice on Grant of Patent Right for Invention from foreign counterpart Chinese Patent Application No. 201180076248.0, dated Feb. 27, 2018, 6 pages.
Notice on Grant of Patent Right for Invention from foreign counterpart Chinese Patent Application No. 201280024012.7, dated Mar. 12, 2018, 4 pages.
First Examination Report from foreign counterpart Indian Patent Application No. 51/KOLNP/2012, dated Jul. 30, 2018, 7 pages.
Non-Final Office Action from U.S. Appl. No. 15/408,323, dated Oct. 9, 2018, 144 pages.
Non-Final Office Action from U.S. Appl. No. 15/853,323, dated Aug. 28, 2018, 115 pages.
Non-Final Office Action from U.S. Appl. No. 15/866,323, dated Oct. 1, 2018, 121 pages.
Notice of Allowance from U.S. Appl. No. 14/213,135, dated Oct. 3, 2018, 34 pages.
Notice of Allowance from U.S. Appl. No. 14/360,284, dated Oct. 12, 2018, 45 pages.
Notice of Allowance from U.S. Appl. No. 15/408,311, dated Aug. 28, 2018, 138 pages.
Notice of Allowance from U.S. Appl. No. 15/712,017, dated Oct. 3, 2018, 16 pages.
Notice of Allowance from U.S. Appl. No. 13/824,013, dated Sep. 19, 2018, 6 pages.
Notice of Allowance from U.S. Appl. No. 15/408,269, dated Sep. 24, 2018, 137 pages.
Communication pursuant to Article 94(3) EPC for Application No. 11876314.3, dated Oct. 19, 2018, 5 pages.
Communication pursuant to Article 94(3) EPC for Application No. 11876314.3, dated Sep. 24, 2018, 6 pages.
Office Action and Search Report from foreign counterpart Taiwan Patent Application No. 106127331, dated Nov. 23, 2018, 13 pages.
Second Office Action from foreign counterpart Chinese Patent Application No. 201480024528.0, dated Oct. 8, 2018, 7 pages.
Notice of Allowance from U.S. Appl. No. 13/824,013, dated Nov. 13, 2018, 12 pages.
Non-Final Office Action from U.S. Appl. No. 15/354,742, dated Dec. 4, 2018, 54 pages.
Non-Final Office Action from U.S. Appl. No. 15/283,836, dated Dec. 27, 2018, 150 pages.
Notice of Allowance from U.S. Appl. No. 15/706,056, dated Dec. 28, 2018, 138 pages.
Communication pursuant to Article 94(3) EPC for Application No. 12174229.0, dated Dec. 20, 2018, 5 pages.
Communication pursuant to Article 94(3) EPC for Application No. 14769411.1, dated Dec. 7, 2018, 7 pages.
Notice of Allowance from foreign counterpart Korean Patent Application No. 10-2018-7003058, dated Dec. 31, 2018, 3 pages.

\* cited by examiner

METHODS, SYSTEMS AND APPARATUS FOR PREDICTING THE WAY OF A SET ASSOCIATIVE CACHE

RELATED APPLICATIONS

This application is a continuation of U.S. patent application Ser. No. 15/257,593, filed on Sep. 6, 2016, which is a continuation of U.S. patent application Ser. No. 14/215,633, filed on Mar. 17, 2014, entitled "Method and Apparatus for Predicting the Way of Set Associative Shadow Cache," which is hereby incorporated herein by reference in its entirety, which claims priority to U.S. Provisional Patent Application Ser. No. 61/793,703, filed on Mar. 15, 2013, entitled "Method and Apparatus for Predicting the Way of Set Associative Shadow Cache" which is also hereby incorporated herein by reference in its entirety.

The following copending International Application No. PCT/US2011/051992 is incorporated herein by reference in its entirety for all purposes: "Single Cycle Multi-Branch Prediction Including Shadow Cache for Early Far Branch Prediction," Mohammad Abdallah, filed on Sep. 16, 2011.

BACKGROUND

A processor, also referred to as a central processor unit (CPU), is the hardware within a computer that carries out the instructions of a computer program by performing the basic arithmetical, logical, and input/output operations of the system. Conventional processors can have a variety of architecture features that can include but are not limited to wide architectures and pipelined architectures.

Processors that have wide architectures are capable of fetching and decoding multiple cache lines of instructions in parallel. In order to optimally support such wide architectures the processor frontend must be capable of supplying multiple cache lines of instructions to the processor scheduler and execution units during each clock cycle.

In addition, processors can encounter a variety of branch instruction types that can present challenges as regards supplying multiple cache-lines of instructions to the processors' scheduler and execution units during each cycle (because of complex program control flows). Such instructions can include what are termed "far branch" instructions and "near branch" instructions (e.g., loop instructions). Far branch instructions are instructions that can alter the flow of instruction execution in a program wherein instruction execution jumps outside of a cache line. Loop instructions are instructions that include a sequence of statements that are specified only once but that are carried out several times in succession before the loop is exited (and can involve jumps within a cache line).

In pipelined architectures multiple sequential instructions are executed simultaneously. However, the pipeline can only be fully utilized if the processor is able to read a next instruction from memory on every cycle. Importantly, the processor must know which instruction is to be next read in order to read that instruction. However, when a far branch instruction is encountered, the processor may not know ahead of time the path that will be taken and thus which instruction is to be next read. In such instances, the processor has to stall until this issue can be resolved. This process can degrade utilization and negatively impact processor performance especially where high-performance processors are concerned and the supply of high throughput from the front end of the device is important.

SUMMARY

In some conventional processors when a conditional branch instruction is encountered, it may not be known ahead of time which path will be taken and thus which instruction is to be read. In such instances, the processor has to stall until the decision is resolved. This can degrade utilization and negatively impact processor performance especially in the case of high-performance processors where high throughput from the front end of the device is required. Methods for predicting a way of a set associative shadow cache is disclosed that addresses these shortcomings. However, the claimed embodiments are not limited to implementations that address any or all of the aforementioned shortcomings. As a part of a method, a request to fetch a first far taken branch instruction of a first cache line from an instruction cache is received, and responsive to a hit in the instruction cache, a predicted way is selected from a way array using a way that corresponds to the hit in the instruction cache. A second cache line that is copied from the target address of the first far taken branch instruction is selected from the shadow cache using the predicted way. The predicted way helps to facilitate the fetching and forwarding of the first cache line and the second cache line in a single clock cycle (by specifying the location of the second cache line in a shadow cache that is provided at the same cache hierarchical level as the instruction cache). This forwarding of multiple cache lines provides the high throughput that high-performance processors require from their front ends.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Figure 1A:
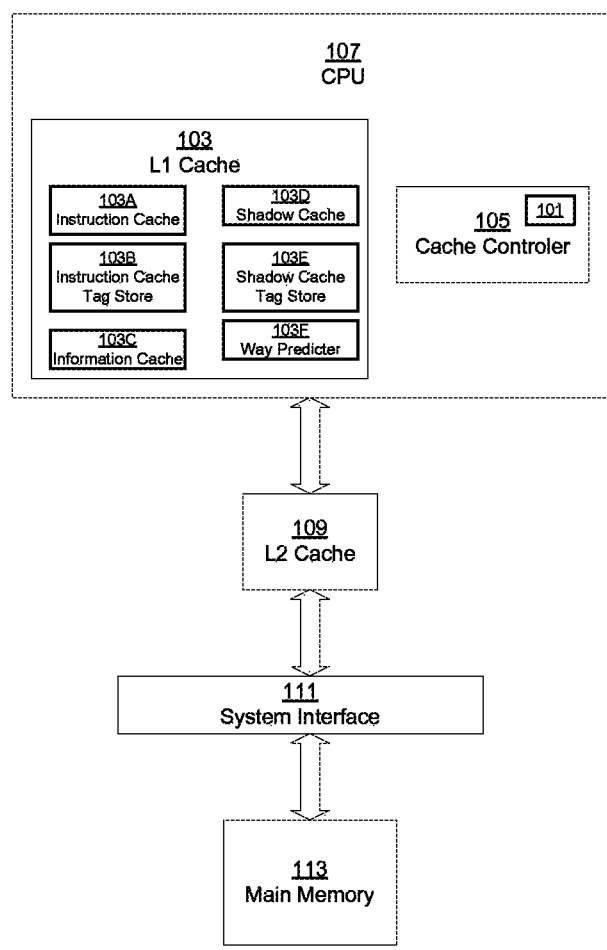
FIG. 1A shows an exemplary operating environment of a system for predicting the way of a set associative shadow cache according to one embodiment.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving" or "reading" or "comparing" or "selecting" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Exemplary Operating Environment of Systems and Apparatus for Predicting the Way of a Set Associative Cache According to One Embodiment FIG. 1A shows an exemplary operating environment 100 of a system 101 for predicting the way of a set associative shadow cache according to one embodiment. System 101, upon receipt of a request to fetch a first far taken branch instruction of a first cache line, determines a predicted way of a shadow cache where a second cache line that is copied from the branch instruction target address is stored and selects the second cache line from the shadow cache using the predicted way. The predicted way helps to facilitate the fetching and forwarding of the first cache line and the second cache line in a single clock cycle (by specifying the location of the second cache line in a shadow cache that is provided at the same cache hierarchical level as the instruction cache). Moreover, the forwarding of multiple cache lines in a single clock cycle provides the high level of throughput that high-performance processors require from their front ends. FIG. 1A shows system 101, level one (L1) cache 103, instruction cache 103a, instruction cache tag store 103b, information cache 103c, shadow cache 103d, shadow cache tag store 103e, way predictor 103F, cache controller 105, CPU 107, level two (L2) cache 109, system interface 111 and main memory 113.

Referring to FIG. 1A, level one (L1) cache 103 is the primary cache of CPU 107 and is static memory which can be integrated with the processor core. Moreover, L1 cache 103 is used to store information that has been recently accessed by CPU 107. In one embodiment, L1 cache 103 can include instruction cache 103a, instruction cache tag store 103b, information cache 103c, shadow cache 103d, shadow cache tag store 103e and way predictor 103f. In one embodiment, instruction cache tag store 103b stores tags for each of the cache lines that are stored in the instruction cache 103a. Instruction cache information store 103c stores the target addresses of first far taken branch instructions. Shadow cache 103d stores copies of cache lines that are stored at the target addresses of first far taken branches. Shadow cache tag store 103e stores a tag for each of the cache lines that are stored in shadow cache 103d. Way predictor 103f stores the way of a set of shadow cache 103d where cache lines from the target of first far taken branches are copied. In one embodiment, shadow cache 103d can have the same number of sets and half the number of ways as does the instruction cache 103a. In other embodiments, other configurations of shadow cache 103d with different numbers of sets and ways can be used.

Referring again to FIG. 1A, cache controller 105 includes the logic used to control cache memory units and to carry out predetermined cache policies. In one embodiment, system 101 and its functionality can be provided as a part of cache controller 105. In other embodiments, system 101, or components thereof, can be separate from cache controller 105. System 101 is described in detail herein below.

Level 2 cache 109 is secondary cache but like L1 cache 103 is used to store recently accessed information. In one embodiment, a cache-line that is stored in L2 cache 109 can be brought from L2 cache 109 and placed into L1 cache 103.

When the cache line is brought from L2 cache 109, data can be decoded from the cache line and placed into information cache 103c.

Main memory 113 includes physical addresses that store information that can be copied into cache memory. Also shown in FIG. 1A is system interface 111. System interface 111 facilitates the transfer of data between main memory 113 and L2 cache 109.

Referring to FIG. 1A, system 101 enables the forwarding of multiple cache lines of instructions to the processor scheduler and execution units (not shown) during each cycle. In one embodiment, system 101 accesses requests to fetch a far taken branch instruction of a first cache line from an instruction cache, and responsive to a hit in the instruction cache, determines the way of a shadow cache that is accessed for a second cache line that is copied from the target address of the first far taken branch and stored in shadow cache 103d (such that both the first cache line and the second cache line can be fetched in a single clock cycle). In one embodiment, a predicted way that is stored in way predictor 103f determines the way of shadow cache 103d that is accessed for the second cache line. In another embodiment, a tag in shadow cache tag cache 103e determines the way of shadow cache 103d that is accessed for the second cache line. Exemplary details related to the determination of the way of shadow cache 103d that is accessed for the second cache line are described below in the operation section.

Figure 1B:
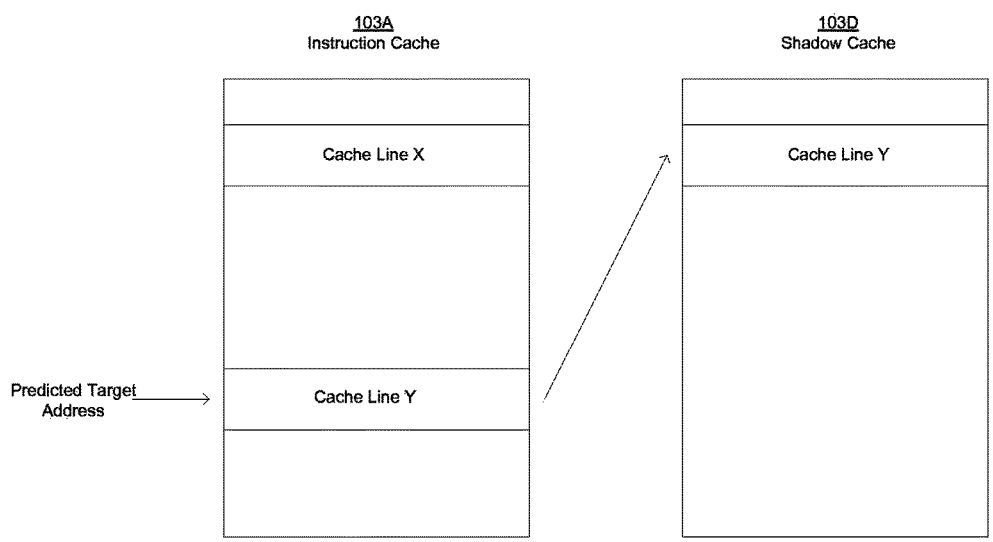
FIG. 1B shows an instruction cache and a shadow cache that stores a copy of a cache line that is copied from a target of a first far taken branch instruction according to one embodiment.
Figure 1C:
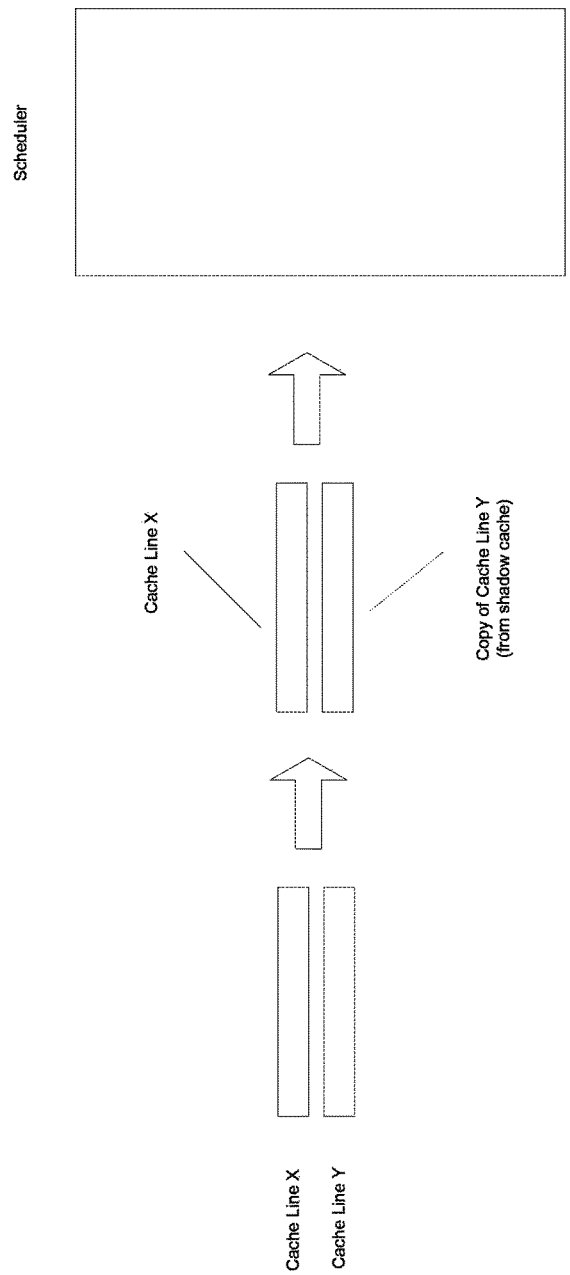
FIG. 1C illustrates the forwarding together of two cache lines based on the operation of a system for predicting a way of a set associative shadow cache according to one embodiment.

In an exemplary embodiment, when a first cache line that contains a first far taken branch is fetched from instruction cache 103a, a second cache line at the cached target address is fetched from shadow cache 103d in the same clock cycle (as opposed to the cache line that follows the first cache line as part of a consecutive code fetch) as is shown in FIG. 1B. In one embodiment, these two cache line can then be forwarded together as shown in FIG. 1C (e.g., to processor scheduler and execution units).

Operation

Figure 1D:
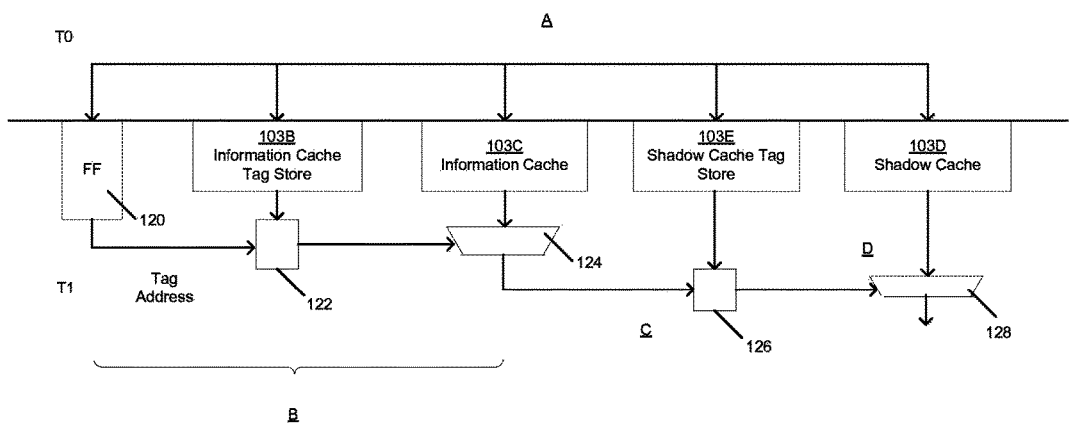
FIG. 1D illustrates operations performed by system for predicting a way of a set associative shadow cache according to one embodiment according to one embodiment.
Figure 1E:
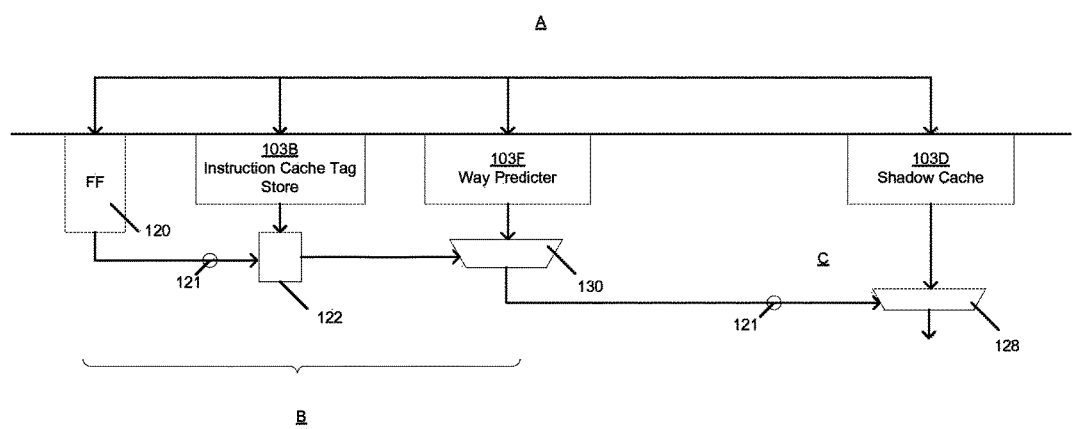
FIG. 1E illustrates operations performed by system for predicting a way of a set associative shadow cache according to one embodiment according to one embodiment.
Figure 1F:
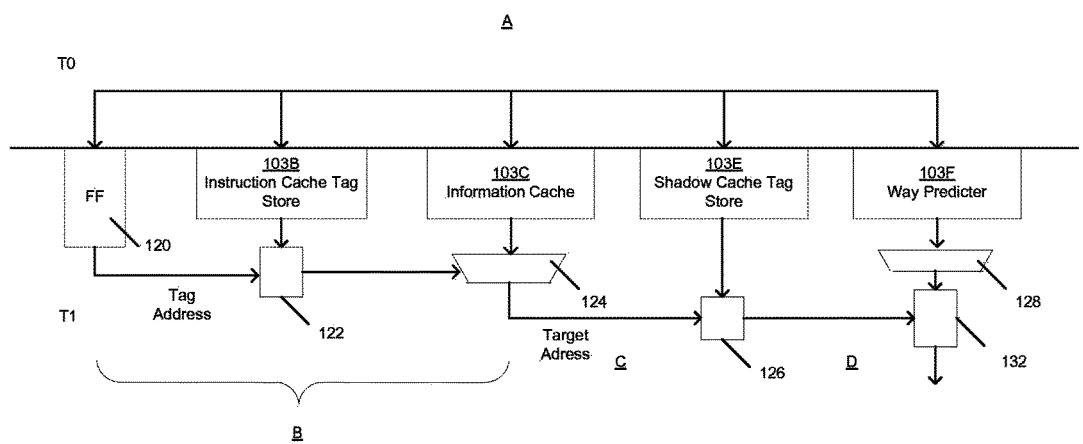
FIG. 1F illustrates validation operations performed by system for predicting a way of a set associative shadow cache according to one embodiment according to one embodiment.

FIGS. 1D-1F illustrates operations performed by system 101 for predicting a way of a set associative shadow cache according to one embodiment according to one embodiment. These operations, which relate to predicting a way of a set associative shadow cache are only exemplary. It should be appreciated that other operations not illustrated by FIGS. 1D-1F can be performed in accordance with one embodiment.

High-performance processors require the front-end of the machine to supply a high-throughput. In the embodiment illustrated in FIG. 1D, high-throughput is supplied by reading more than one cache line in the same clock cycle for forwarding purposes. In one embodiment, in order to accomplish this, a cache line stored at the target of a predicted-first-far-taken-branch instruction of a first cache line in the instruction cache 103a is copied into shadow cache 103d. The shadow cache ways are fetched in parallel to the instruction cache line being fetched. To supply the two cache lines in the same cycle requires predicting the target of a first far taken branch where the target is in a different cache-line (far branch). This predicted target is compared with the tags of shadow cache 103d. The comparison generates a way select that is used to read the copy of the cache line of instructions that is stored at the target address out of shadow cache 103d.

Information cache 103c stores the target address of the predicted first-far-taken-branch. In one embodiment, when a cache line is fetched, and it is predicted to have a far-branch, the target of this branch is read out of information cache 103c and compared to the tags at that set in shadow cache 103d. The 'way' that has the hit is then used to select the data out of the shadow cache data array. These operations are illustrated in FIG. 1D.

Exemplary Embodiment

Referring to FIG. 1D, at A, system 101, in response to a request to fetch a first far taken branch instruction of a first cache line from an instruction cache, an instruction cache (e.g., 103a in FIG. 1A) along with other cache components are read at a first time T0. As shown in FIG. 1D, the additional cache components that are read at time T0 include but are not limited to instruction cache tag storage 103b, information cache 103c, shadow cache tag storage 103e and way predictor 103f.

At B, responsive to a hit in said instruction cache, at time T1, a way corresponding to the hit is used to select a target address that is stored in information cache 103c. In particular, in one embodiment, a tag address 122 that is read from flip-flop 120 is compared to the tags at the indicated set in instruction cache tag store 103b to determine the way that corresponds to the hit in the instruction cache (e.g., 103a in FIG. 1A). The way of instruction cache tag store 103b that has the hit is used as an input to a selection component 124 (e.g., a multiplexor) that causes a selection of a target address from the corresponding way of information cache 103c.

At C, the target address is compared to tags at the indicated set in shadow cache tag store 103e to determine the way that has the hit.

At D, the way that has the hit in shadow cache tag store 103e is used as an input to data selection component 128 that selects data from shadow cache 103d such as a second cache line that is copied from the target address of the first far taken branch and stored in shadow cache 103d. In one embodiment, the first cache line and the second cache line can then be forwarded together such as to processor scheduler and execution units (not shown). In one embodiment, the first cache line and the second cache line can be forwarded together to processor scheduler and execution units in the same clock cycle.

Exemplary Embodiment

FIG. 1E illustrates the use of a way predictor 103f for way prediction in accordance with one embodiment. In one embodiment, way predictor 103f stores predicted ways per way of instruction cache 103a. In one embodiment, a small array can be used to implement way predictor 103f. When a hit in instruction cache 103a is determined, the way of instruction cache 101a where the hit occurs is used to select the predicted way from way predictor 103f. The predicted way is then used to directly select the data (e.g., a cache line) that is stored at that way of shadow cache 103d. This reduces the critical path significantly. In one embodiment, predicted-way select multiplexor 130 that is used in the FIG. 1E embodiment, can be smaller in size than branch target multiplexor 124 that is used in the FIG. 1D embodiment. In one embodiment, the comparison with the shadow-tag can be eliminated from the critical path.

Referring to FIG. 1E, at A, system 101A, in response to a request to fetch a first far taken branch instruction of a first cache line from an instruction cache, an instruction cache (e.g., 103a in FIG. 1A) is read at a first time T0. As shown in FIG. 1E, cache components that are simultaneously read include but are not limited to instruction cache tag store 103b, way predictor 103f and shadow cache 103d.

At B, responsive to a hit in said instruction cache, a way corresponding to the hit is used to select a predicted way that is stored in way predictor 103f (a cache array). In one embodiment, a tag address 121 that is read from flip-flop 120 is compared by comparer 122 to the tags at the indicated set in instruction cache tag store 103b. The way of instruction cache tag store 103b that has the hit is used to select a predicted shadow cache way from way predictor 103f.

At C, the predicted way 131 is used as an input to selection component 128 which selects data from shadow cache 103d (data such as a second cache line that is copied from the target address of the first far taken branch instruction and stored in shadow cache 103d). In one embodiment, the first and the second cache lines can then be forwarded together such as to processor scheduler and execution units (not shown). In one embodiment, the first and the second cache lines can be forwarded together to processor scheduler and execution units in the same clock cycle.

Validation

FIG. 1F illustrates the validation of a predicted target that is stored in way predictor 103f. The validation is made by comparing the output of way predictor 103f (the predicted target) with the output of shadow tag comparer 126 (which identifies the actual way that stores the target address in the shadow cache). In one embodiment, the predicted way can be maintained in multiple ways. For example, in one embodiment, the result of the aforementioned comparison can used to determine the predicted way, e.g., a determined miss is used to control the updating of the way.

Referring to FIG. 1F, at A, system 101, in response to a request to fetch a first far taken branch instruction of a first cache line from an instruction cache, an instruction cache (e.g., 103a in FIG. 1A) along with other cache components are read at a first time T0. As shown in FIG. 1D, the additional cache components that are read at time T0 include but are not limited to instruction cache tag storage 103b, information cache 103c, shadow cache tag storage 103e and way predictor 103f.

At B, responsive to a hit in said instruction cache, at time T1, a way corresponding to the hit is used to select a target address that is stored in information cache 103c. In particular, in one embodiment, a tag address 122 that is read from flip-flop 120 is compared to the tags at the indicated set in instruction cache tag store 103b to determine the way that corresponds to the hit in the instruction cache (e.g., 103a in FIG. 1A). The way of instruction cache tag store 103b that has the hit is used as an input to a selection component 124 (e.g., a multiplexor) that causes a selection of a target address from the corresponding way of information cache 103c.

At C, the target address is compared to tags at the indicated set in shadow cache tag store 103e to determine the way that has the hit.

At D, the way that has the hit in shadow cache tag storage 103e is compared with the way that is stored in way predictor 103f.

Figure 2:
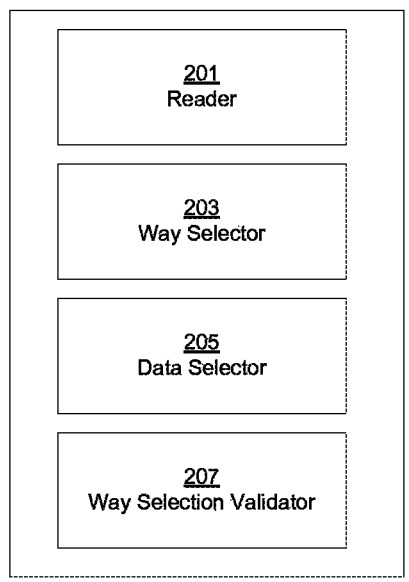
FIG. 2 shows components of a system for predicting a way of a set associative shadow cache according to one embodiment.

Components of System for Predicting the Way of a Set Associative Cache According to One Embodiment FIG. 2 shows components of a system 101 for predicting a way of a set associative shadow cache according to one embodiment. In one embodiment, components of system 101 implement an algorithm for predicting a way of a set associative shadow cache. In the FIG. 2 embodiment, components of system 101 include cache reader 201, way selector 203, data selector 205 and way comparer 207.

Cache reader 201 reads cache components in response to a request to fetch a first far taken branch instruction of a first cache line from an instruction cache. In one embodiment, cache reader 201 can read cache components that include but are not limited to an instruction cache tag store, a way predictor and a shadow cache.

Way selector 203 selects a way that is used to select data from a shadow cache. In one embodiment, way selector 203 can be implemented using an array that stores predicted ways that can be selected from the array and a multiplexor that receives a way input that is provided based on a hit that is made in an instruction cache tag store (see FIG. 1A). In another embodiment, way selector can be implemented using an information cache (e.g., 103c in FIG. 1A) and a shadow cache tag store (e.g., 103e in FIG. 1A) where a target address from information cache (e.g., 103c in FIG. 1A) is used to determine a way hit in a shadow cache tag store (e.g., 103e in FIG. 1A) that provides the way of the shadow cache (e.g., 103d in FIG. 1A) from which to select data (e.g., a cache line).

Data selector 205 uses the way that is provided by way selector 203 to select data from a shadow cache such as a second cache line that has been copied from the target address of the first far taken branch instruction and stored in the shadow cache (e.g., 103d in FIG. 1A). In one embodiment, the first and second cache lines can then be forwarded together such as to processor scheduler and execution units (not shown). In one embodiment, the first and second cache lines can be forwarded in the same clock cycle. In one embodiment, data selector 205 can be implemented using a multiplexor.

Way selection validator 207 compares the way that is indicated by a shadow cache tag store (e.g., 103e in FIG. 1A) and the predicted way provided by way predictor (e.g., 103f in FIG. 1A).

It should be appreciated that the aforementioned components of system 101 can be implemented in hardware, software, firmware or in some combination thereof. In one embodiment, components and operations of system 101 can be encompassed by components and operations of one or more computer components or programs (e.g., a cache controller 105). In another embodiment, components and operations of system 101 can be separate from the aforementioned one or more computer components or programs but can operate cooperatively with components and operations thereof.

Figure 3A:
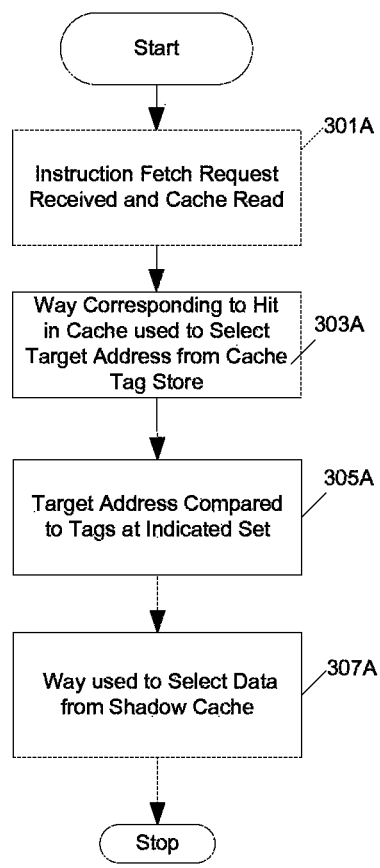
FIG. 3A shows a flowchart of the steps performed in an exemplary method for predicting a way of a set associative shadow cache according to one embodiment.
Figure 3B:
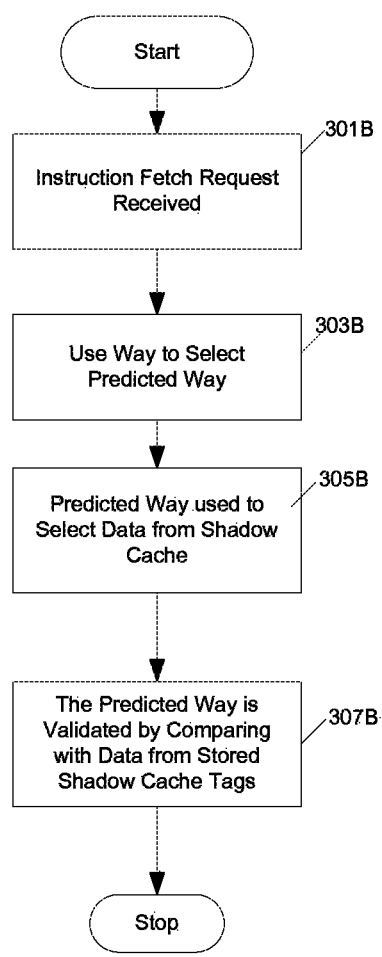
FIG. 3B shows a flowchart of the steps performed in an exemplary method for predicting a way of a set associative shadow cache according to one embodiment.

Method for Predicting the Way of a Set Associative Cache According to One Embodiment According to One Embodiment FIGS. 3A and 3B show flowchart 300A and 300B of the steps performed in an exemplary method for predicting a way of a set associative shadow cache according to one embodiment. The flowcharts include processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowcharts.

Referring to FIG. 3A, at 301A, responsive to a request to fetch a first far taken branch instruction of a first cache line, an instruction cache tag store (e.g., 103b in FIG. 1A), an information cache (e.g., 103c in FIG. 1A), a shadow cache (e.g., 103d in FIG. 1A) and a shadow cache tag store (e.g., 103e in FIG. 1A) are read.

At 303A, responsive to a hit in the instruction cache, a way corresponding to the hit (as indicated by the instruction cache tag store 103b in FIG. 1A) is used to select a target address that is stored in the information cache (e.g., 103c in FIG. 1A).

At 305A, the target address is compared to tags at the indicated set in the shadow cache tag store (e.g., 103e in FIG. 1A) to determine a way of the shadow cache (e.g., 103d) that has the hit.

At 307A, the way that has the hit in shadow cache tag store (e.g., 103e in FIG. 1A) is used to select data from the shadow cache (e.g., 103d in FIG. 1A). In one embodiment, the data is a second cache line that has been copied from the target address of the first far taken branch instruction and stored in the shadow cache (e.g., 103d in FIG. 1A). In one embodiment, the first and second cache lines can then be forwarded together, in the same clock cycle, to the processor scheduler and execution units (not shown).

Referring to FIG. 3B, at 301B a request is received to fetch a first far taken branch instruction of a first cache line from an instruction cache (e.g., 103c in FIG. 1A).

At 303B, responsive to a determination of a hit in the instruction cache, a way corresponding to the hit is used to select a predicted way that is stored in a way predictor (e.g., 103f in FIG. 1A).

At 305B, the predicted way is used to select data from a shadow cache (e.g., 103d in FIG. 1A). In one embodiment, the data is a second cache line that has been copied from the target address of the first far taken branch instruction and stored in the shadow cache (e.g., 103d in FIG. 1A). In one embodiment, the first and second cache lines can then be forwarded together such as to the processor scheduler and execution units (not shown).

At 307B the predicted way that is provided by the way predictor (e.g., 103f in FIG. 1A) is compared with the way that is indicated by a shadow cache tag store (e.g., 103e in FIG. 1A) to determine if the predicted way is valid.

With regard to exemplary embodiments thereof, a method for predicting a way of a set associative shadow cache is disclosed. As part of a method, a request to fetch a first far taken branch instruction of a first cache line from an instruction cache is received, and responsive to a hit in the instruction cache, a predicted way is selected from a way array using a way that corresponds to the hit in the instruction cache. A second cache line is selected from the shadow cache using the predicted way and the first cache line and the second cache line are forwarded in the same clock cycle.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A method for fetching a cache line of a far taken branch instruction and a cache line of a target of the far taken branch instruction, the method comprising:
    determining a hit at a first way of an instruction cache for the far taken branch instruction;
    determining a target address from an information cache based on the first way;
    determining a second way from a shadow cache tag structure based on the target address; and
    fetching the far taken branch instruction from the instruction cache based on the first way and the target of the far taken branch instruction from a shadow cache based on the second way.

2. The method of claim 1, wherein the information cache stores addresses for targets of far taken branch instructions.

3. The method of claim 1, wherein the far taken branch instruction is in a first cache line and the target of the far taken branch instruction is in a second cache line.

4. The method of claim 3, wherein the first cache line and the second cache line are fetched in a same clock cycle.

5. The method of claim 3, further comprising:
    forwarding the first cache line and the second cache line to a scheduler of a processor for execution by one or more execution units.

6. The method of claim 1, further comprising:
    copying targets of one or more far taken branch instructions, including the far taken branch instruction, to the shadow cache.

7. A method for fetching a cache line of a far taken branch instruction and a cache line of a target of the far taken branch instruction, the method comprising:
    determining a hit at a first way of an instruction cache for the far taken branch instruction;
    determining a second way from a way predictor based on the first way, wherein the way predictor stores predicted ways per way from the instruction cache; and
    fetching the far taken branch instruction from the instruction cache based on the first way and the target of the far taken branch instruction from a shadow cache based on the second way.

8. The method of claim 7, wherein the far taken branch instruction is in a first cache line and the target of the far taken branch instruction is in a second cache line.

9. The method of claim 8, wherein the first cache line and the second cache line are fetched in a same clock cycle.

10. The method of claim 8, further comprising:
    forwarding the first cache line and the second cache line to a scheduler of a processor for execution by one or more execution units.

11. The method of claim 7, further comprising:
    copying targets of one or more far taken branch instructions, including the far taken branch instruction, to the shadow cache.

12. A processor for fetching a cache line of a far taken branch instruction and a cache line of a target of the far taken branch instruction, the processor comprising:
    a cache reader to determine a hit at a first way of an instruction cache for the far taken branch instruction;
    a selection component to determine a target address from an information cache based on the first way;
    a way selector to determine a second way from a shadow cache tag structure based on the target address; and
    a data selector to fetch the far taken branch instruction from the instruction cache based on the first way and the target of the far taken branch instruction from a shadow cache based on the second way.

13. The processor of claim 12, wherein the information cache stores addresses for targets of far taken branch instructions.

14. The processor of claim 12, wherein the far taken branch instruction is in a first cache line and the target of the far taken branch instruction is in a second cache line.

15. The processor of claim 14, wherein the first cache line and the second cache line are fetched in a same clock cycle.

16. The processor of claim 12, wherein the shadow cache includes targets of one or more far taken branch instructions, including the far taken branch instruction.

17. A processor for fetching a cache line of a far taken branch instruction and a cache line of a target of the far taken branch instruction, the processor comprising:
- a cache reader to determine a hit at a first way of an instruction cache for the far taken branch instruction;
- a way selector to determine a second way from a way predictor based on the first way, wherein the way predictor stores predicted ways per way from the instruction cache; and
- a data selector to fetch the far taken branch instruction from the instruction cache based on the first way and the target of the far taken branch instruction from a shadow cache based on the second way.

18. The processor of claim 17, wherein the far taken branch instruction is in a first cache line and the target of the far taken branch instruction is in a second cache line.

19. The processor of claim 18, wherein the first cache line and the second cache line are fetched in a same clock cycle.

20. The processor of claim 18, further comprising:
- one or more execution units for receiving the first cache line and the second cache line in a same clock cycle.

* * * * *